(12) United States Patent
Cern

(10) Patent No.: US 6,897,764 B2
(45) Date of Patent: May 24, 2005

(54) INDUCTIVE COUPLING OF A DATA SIGNAL FOR A POWER TRANSMISSION CABLE

(75) Inventor: Yehuda Cern, Brookline, MA (US)

(73) Assignee: Ambient Corporation, Newton, MA (US)

(*) Notice: Subject to any disclaimer, the term of this patent is extended or adjusted under 35 U.S.C. 154(b) by 0 days.

(21) Appl. No.: 10/320,306

(22) Filed: Dec. 16, 2002

(65) Prior Publication Data

US 2003/0160684 A1 Aug. 28, 2003

Related U.S. Application Data

(60) Continuation of application No. 09/948,895, filed on Sep. 7, 2001, now Pat. No. 6,646,447, which is a division of application No. 09/752,705, filed on Dec. 28, 2000, now Pat. No. 6,452,482.

(60) Provisional application No. 60/198,671, filed on Apr. 20, 2000, and provisional application No. 60/173,808, filed on Dec. 30, 1999.

(51) Int. Cl.[7] .............................................. H04M 11/04
(52) U.S. Cl. ........................... 340/310.01; 340/310.03; 340/310.05; 340/310.07
(58) Field of Search ..................... 340/310.01–310.08; 324/66; 375/258, 259, 273

(56) References Cited

U.S. PATENT DOCUMENTS

| | | | |
|---|---|---|---|
| 4,004,110 A | 1/1977 | Whyte | 179/170 J |
| 4,016,429 A | 4/1977 | Vercellotti et al. | 307/149 |
| 4,142,178 A | 2/1979 | Whyte et al. | 340/310 R |
| 4,188,619 A | 2/1980 | Perkins | 340/310 R |
| 4,254,402 A | 3/1981 | Perkins | 340/310 R |
| 4,323,882 A | 4/1982 | Gajjar | 340/310 R |
| 4,357,598 A | 11/1982 | Melvin, Jr. | 340/310 A |
| 4,408,186 A | 10/1983 | Howell | 340/310 R |
| 4,433,284 A | 2/1984 | Perkins | 323/361 |
| 4,433,326 A * | 2/1984 | Howell | 340/310.07 |
| 4,473,816 A | 9/1984 | Perkins | 340/310 R |
| 4,481,501 A | 11/1984 | Perkins | 340/310 R |
| 4,602,240 A | 7/1986 | Perkins et al. | 340/310 R |
| 4,644,321 A | 2/1987 | Kennon | 340/310 A |
| 4,668,934 A | 5/1987 | Shuey | 340/310 A |
| 4,675,648 A | 6/1987 | Roth et al. | 340/310 A |
| 4,709,339 A * | 11/1987 | Fernandes | 700/293 |
| 4,745,391 A * | 5/1988 | Gajjar | 340/310.07 |
| 4,772,870 A | 9/1988 | Reyes | 340/310 R |
| 4,800,363 A | 1/1989 | Braun et al. | 340/310 A |
| 4,903,006 A | 2/1990 | Boomgaard | 340/310 A |
| 5,066,939 A | 11/1991 | Mansfield, Jr. | 340/310 R |
| 5,181,026 A * | 1/1993 | Granville | 340/870.28 |
| 5,210,519 A | 5/1993 | Moore | 340/310 R |
| 5,257,006 A | 10/1993 | Graham et al. | 340/310 A |
| 5,301,208 A | 4/1994 | Rhodes | 375/36 |
| 5,351,272 A | 9/1994 | Abraham | 375/38 |
| 5,404,127 A | 4/1995 | Lee et al. | 340/310.02 |
| 5,406,249 A | 4/1995 | Pettus | 340/310.06 |
| 5,424,710 A | 6/1995 | Baumann | 340/310.01 |
| 5,497,142 A | 3/1996 | Chaffanjon | 340/310.06 |
| 5,559,377 A | 9/1996 | Abraham | 307/104 |
| 5,581,229 A | 12/1996 | Hunt | 340/310.02 |

(Continued)

FOREIGN PATENT DOCUMENTS

| EP | 0 889 602 | 2/2000 |
|---|---|---|
| EP | 0 978 952 | 2/2000 |

OTHER PUBLICATIONS

European Search Report dated Nov. 26, 2004.

*Primary Examiner*—Donnie L. Crosland
(74) *Attorney, Agent, or Firm*—Ohlandt, Greeley, Ruggiero & Perle, LLP

(57) ABSTRACT

There is provided a coupler for a data signal. The coupler includes a core through which a phase conductor of a power distribution system can be routed, and a winding wound around a portion of the core. The data signal is inductively coupled between the phase conductor and the winding via the core.

27 Claims, 23 Drawing Sheets

U.S. PATENT DOCUMENTS

| | | | | |
|---|---|---|---|---|
| 5,684,450 A | 11/1997 | Brown | ................. | 340/310.02 |
| 5,684,451 A | 11/1997 | Seberger et al. | ....... | 340/310.06 |
| 5,684,826 A | 11/1997 | Ratner | ....................... | 375/222 |
| 5,691,691 A | 11/1997 | Merwin et al. | ........ | 340/310.02 |
| 5,694,108 A | 12/1997 | Shuey | .................. | 340/310.01 |
| 5,705,974 A | 1/1998 | Patel et al. | ............ | 340/310.08 |
| 5,717,685 A | 2/1998 | Abraham | ..................... | 370/30 |
| 5,777,769 A | 7/1998 | Coutinho | .................... | 359/173 |
| 5,777,789 A | 7/1998 | Chiu et al. | .................. | 359/494 |
| 5,818,127 A | 10/1998 | Abraham | ..................... | 307/106 |
| 5,844,949 A | 12/1998 | Hershey et al. | ............. | 375/346 |
| 5,856,776 A | 1/1999 | Armstrong et al. | .... | 340/310.01 |
| 5,859,584 A | 1/1999 | Counsell et al. | ............ | 340/538 |
| 5,864,284 A | 1/1999 | Sanderson | ............. | 340/310.01 |
| 5,892,795 A | 4/1999 | Paret | .......................... | 375/222 |
| 5,929,750 A | 7/1999 | Brown | .................. | 340/310.02 |
| 5,933,071 A | 8/1999 | Brown | .................. | 340/310.01 |
| 5,952,914 A | 9/1999 | Wynn | .................... | 340/310.01 |
| 5,977,650 A | 11/1999 | Rickard et al. | ................ | 307/3 |
| 5,982,276 A | 11/1999 | Stewart | ................. | 340/310.01 |
| 5,994,998 A | 11/1999 | Fisher et al. | ........... | 340/310.01 |
| 5,995,911 A * | 11/1999 | Hart | ............................. | 702/64 |
| 6,023,106 A | 2/2000 | Abraham | ....................... | 307/3 |
| 6,037,678 A | 3/2000 | Rickard | ....................... | 307/89 |
| 6,040,759 A | 3/2000 | Sanderson | ............. | 340/310.01 |
| 6,104,707 A | 8/2000 | Abraham | .................... | 370/295 |
| 6,144,292 A | 11/2000 | Brown | .................. | 340/310.02 |
| 6,154,488 A | 11/2000 | Hunt | ......................... | 375/219 |
| 6,172,597 B1 | 1/2001 | Brown | .................. | 340/310.02 |
| 6,297,729 B1 | 10/2001 | Abali et al. | ............ | 340/310.01 |
| 6,297,730 B1 | 10/2001 | Dickinson | ............. | 340/310.01 |
| 6,300,881 B1 | 10/2001 | Yee et al. | ............. | 340/870.02 |
| 6,313,738 B1 | 11/2001 | Wynn | .................... | 340/310.03 |
| 6,317,031 B1 | 11/2001 | Rickard | ................. | 340/310.03 |
| 6,331,814 B1 | 12/2001 | Albano et al. | ......... | 340/310.01 |
| 6,404,773 B1 | 6/2002 | Williams et al. | ........ | 370/463 |
| 6,407,987 B1 | 6/2002 | Abraham | .................... | 370/295 |
| 6,449,348 B1 | 9/2002 | Lamb et al. | ............. | 379/93.36 |
| 6,452,482 B1 * | 9/2002 | Cern | ..................... | 340/310.01 |
| 6,529,120 B1 | 3/2003 | Bilenko et al. | ........ | 340/310.06 |
| 6,577,230 B1 | 6/2003 | Wendt et al. | .......... | 340/310.01 |

* cited by examiner

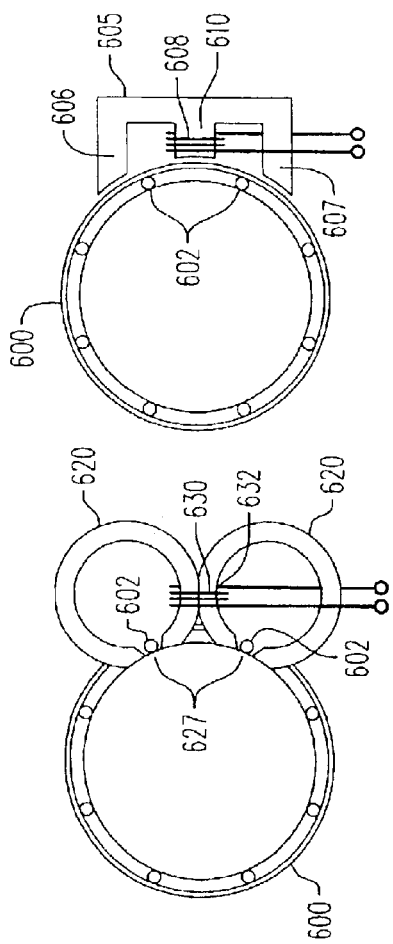
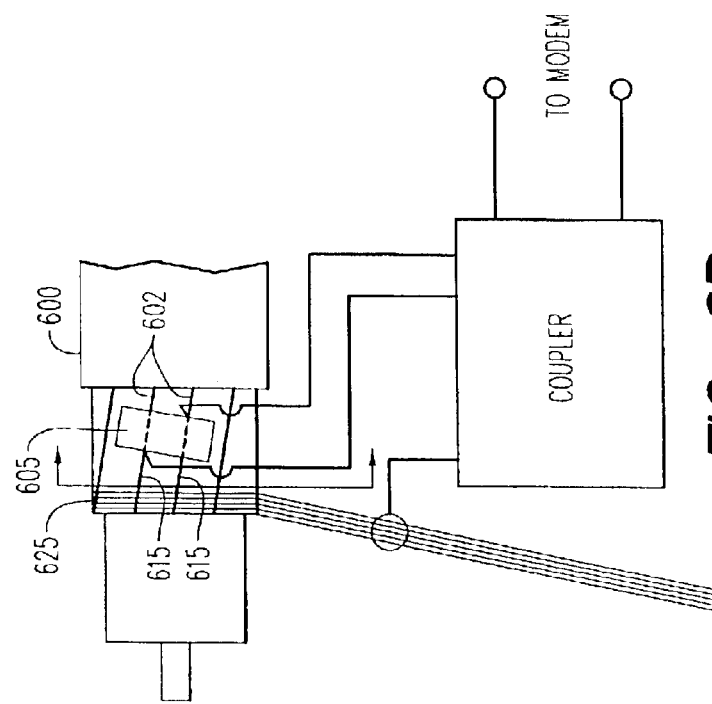
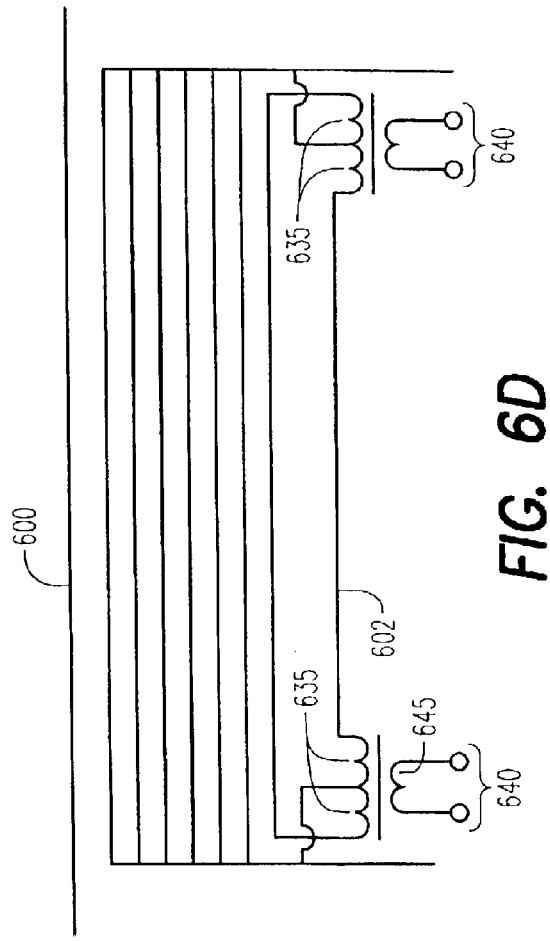

INDUCTIVE COUPLING OF A DATA SIGNAL FOR A POWER TRANSMISSION CABLE

CROSS-REFERENCE TO RELATED APPLICATIONS

The present application is a continuation of U.S. patent application Ser. No. 09/948,895, file Sep. 7, 2001, U.S. Pat No. 6,646,447 which is a divisional of U.S. patent application Ser. No. 09/752,705, filed on Dec. 28, 2000, now U.S. Pat. No. 6,452,482, which claimed priority of (a) U.S. Provisional Patent Application Ser. No. 60/1 73,808, filed on Dec. 30, 1999, and (b) U.S. Provisional Patent Application Ser. No. 60/198,671, filed on Apr. 20, 2000.

BACKGROUND OF THE INVENTION

1. Field of the Invention

The present invention relates to communication of a data signal over a power distribution system, and more particularly, to a use of an inductive coupler for coupling a data signal via a conductor in a power transmission cable.

2. Description of the Prior Art

Low voltage (LV) power lines within the confines of a home or business have been used as a medium for point to point or network communications using so called "carrier" systems in which a data signal is modulated onto a high frequency (HF) carrier and transmitted over the power lines. Internet access, which requires "last mile" connectivity between the Internet data trunk and each domicile, would greatly enhance the utility of such networks.

A medium voltage (MV) typically 4–66 kV is reduced to a low voltage (LV) typically 100–500 volts, through an MV-LV distribution transformer. A medium voltage power distribution grid feeds many homes and businesses via distribution transformers. If data is present on the medium voltage power grid, it would be desirable to couple broadband data streams from transformer substations to entire sections of a neighborhood, but the distribution transformers effectively block high frequency energy and thus block the data from getting to the LV drop lines.

In countries using nominal low voltages of 125 volts or less, such as in North America, drop lines from the distribution transformer to the electrical load in the home or business are usually kept shorter than about 50 meters, so as to minimize voltage drop across the lines and to preserve adequate voltage regulation. Typically, only one to ten homes or businesses are supplied from each distribution transformer. For such a small number of potential users, it is not economical to procure an expensive high data rate feed, such as fiber or T1, and couple it via power line communications devices to the low voltage side of the transformer. Accordingly, in order to exploit the medium voltage distribution grid as a data backhaul channel, a device is required to bypass the distribution transformer.

In a power distribution system, a high voltage (HV) typically 100–800 kV, is stepped-down to a medium voltage through an HV-MV step-down transformer at a transformer substation. The high frequency blocking characteristics of distribution transformers isolate the medium voltage power distribution grid from high frequency noise present on both the low voltage and the high voltage (HV) lines. The medium voltage grid is thus a relatively quiet medium, ideal for communicating high speed data as a data distribution system or "backhaul line."

The above-mentioned transformers block practically all energy in the megahertz frequency range. In order to couple high frequency modulated data from the MV lines to the LV lines, a bypass device must be installed at each transformer site. Devices are presently available and used for low frequency, low data rate data coupling applications. Such applications are often termed Power Line Communications (PLC). These devices typically include a high voltage series coupling capacitor, which must withstand a Basic Impulse Loading (BIL) voltage, typically above 50 kV. Such devices are thus expensive, bulky, and have an impact on overall power grid reliability. Furthermore, in some cases, during their installation they require disconnecting power from the customers.

In countries having a nominal low voltage in the 100–120 volt range, such as Japan and the US, the number of distribution transformers is especially large. This is because the MV-LV distribution transformers are placed relatively close to the load to keep the feed resistance low. Low feed resistance is desired to maintain reasonable level of voltage regulation, that is, minimal variation in supply voltage with varying load currents. LV feed lines for distances much in excess of 50 meters would require impracticably thick wires.

For a data coupler to be effective, it must be considered in the context in which it operates in conjunction with the high frequency characteristics of the MV power lines and with other components connected to these lines, such as transformers, power factor correction capacitors, PLC coupling capacitors, and disconnect switches. These components operate at different voltages in different countries and regions. The operating voltage level has a direct impact on the geometry of the construction of medium voltage power devices and the terminal impedance of these devices at Megahertz frequencies. Other factors affecting high frequency signals on MV power lines include the geometry of the network, e.g., branching, the use of very low impedance underground cables that connect to high impedance overhead lines, and the possibility of a splitting of a network into sub-networks due to an actuation of a disconnect switch. Therefore, the suitability of an MV-LV coupler device must be considered in the context of the specific characteristics of the equipment used in each country and the MV voltage level.

Overhead transmission lines are characterized by two or mores wires run at essentially constant spacing, with air dielectric between them. Such lines have a characteristic impedance in the 300 to 500 ohms range, and very low loss. Coaxial underground cables comprise a center conductor surrounded by a dielectric, over which are wound neutral conductors. Such cables have a characteristic impedance in the range of 20 to 40 ohms, and display loss for Megahertz signals that may be as low as 2 dB per hundred-meter length, depending on the loss properties of the dielectric.

An MV-LV distribution transformer, whether designed for operation from single phase to neutral or from phase to phase in a three phase grid, has a primary winding on the MV side that appears as having an impedance in the 40 to 300 ohm range for frequencies above 10 MHz. Power factor correction capacitors have large nominal capacitance values (e.g. 0.05–1 uF), but their high frequency impedance is primarily determined by series inductance inherent in their construction. PLC coupling capacitors have lower nominal capacitances, for example, 2.2–10 nF, but may have high frequency impedances that are relatively low relative to the power cable's characteristic impedance. Any of the aforementioned devices may produce a resonance in the megahertz range, i.e., the imaginary part of a complex impedance becomes zero ohms, but the devices do not have high Q factors at these frequencies, and so the magnitude of the impedance typically does not approach zero for a series resonance or an extremely high value for a parallel resonance.

Another device used on MV grids, especially in Japan, is a remotely controlled three phase disconnect switch. When a data signal is transmitted over a phase line that passes through such a switch, continuity of the data needs to be maintained even when the phase line is opened through the switch.

SUMMARY OF THE INVENTION

It is an object of the present invention to provide an improved coupler for coupling a data signal to a conductor in a power transmission cable.

It is another object of the present invention to provide such a coupler that is inexpensive and has a high data rate capacity.

It is a further object of the present invention to provide such a coupler that can be installed without interrupting service to power customers.

It is still a further object of the present invention to provide such a coupler using only passive components that have a virtually unlimited service life.

These and other objects of the present invention are achieved by a coupler for a data signal. The coupler includes a core through which a phase conductor of a power distribution system can be routed, and a winding wound around a portion of the core. The data signal is inductively coupled between the phase conductor and the winding via the core.

BRIEF DESCRIPTION OF THE DRAWINGS

FIGS. 6A–6C are illustrations of several arrangements of a balanced transmission line using two neutral wires and magnetic induction, in accordance with the present invention.

FIG. 6D is a schematic representation of the arrangements of 6A–6C.

DESCRIPTION OF THE INVENTION

Overhead and underground medium voltage transmission lines may be used for the bi-directional transmission of digital data. Such transmission lines cover the path between a power company's transformer substation and one or more MV-LV distribution transformers placed throughout a neighborhood. The MV-LV distribution transformers step the medium voltage power down to low voltage, which is then fed to homes and businesses.

The present invention relates to a use of a coupler in a medium voltage grid. The coupler is for enabling communication of a data signal via a power transmission cable. It has a first winding for coupling the data signal via a conductor of the power transmission cable, and a second winding, inductively coupled to the first winding, for coupling the data signal via a data port.

One embodiment of the present invention is employed with a power transmission cable having one or more neutral wires, i.e., conductors, wrapped around an outer layer of the cable, similarly to a coaxial cable. One or more of the neutral wires of the power transmission cable serves as a conductor for one or more data signals.

Another embodiment is employed with a phase conductor of a power transmission cable. In this case, the phase conductor of the power transmission cable serves as a conductor for one or more data signals.

Figure 1:
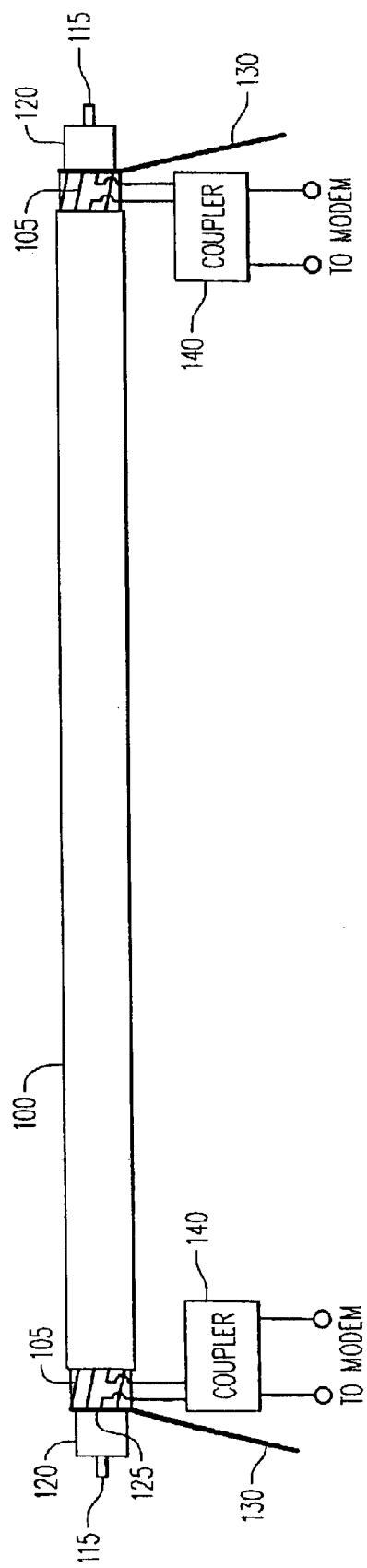
FIG. 1 is an illustration of a typical underground coaxial medium voltage distribution cable, showing a neutral wire being used as a communication medium, in accordance with the present invention.

FIG. 1 is an illustration of a typical underground coaxial medium voltage distribution cable 100 with an inductive coupler coupled thereto, in accordance with the present invention. Cable 100 has a multiplicity of N neutral conductors 105 wrapped spirally around a core insulator 120, which surrounds a phase conducting wire 115. For example, in a Pirelli Cable X-0802/4202/0692 TRXLPE 25 KV 260 mils 1/0 AWG A1 cable, which is available from Pirelli Cavi e Sistemi S.p.A., Viale Sarca, 222, Milano, Italy 20126, there is a phase conducting wire surrounded by insulation around which are wound 8 strands of 2.8 mm diameter copper. Cables having 12 to 16 neutral conductors are also common.

Neutral conductors 105 are separated and insulated from each other in a cable segment. At an end of cable 100, a strand of each neutral conductor 105 is exposed and wrapped tangentially, forming a ring of copper wire 125 a short distance from the end of the cable, to form a terminus. These strands are gathered together into a single stranded wire 130 and connected to a grounding post at an MV-LV distribution transformer.

A coupler 140 is already insulated from phase conductor 115, the latter certified to withstand both the steady state and transient voltages for which the cable is rated. Exploiting existing insulation obviates the expense of providing it again for the coupler. The coupler can be packaged with ordinary plastic materials.

Coupler 140 includes a first winding (not shown in FIG. 1) and second winding (not shown in FIG. 1). The first winding is provided by the cable itself while the second winding can comprise one or two turns of stranded, small diameter hookup wire, with minimal insulation.

In an underground cable, such as cable 100, the use of inductive coupler 140 is particularly cost effective, as it takes advantage of the existing insulator 120 to provide isolation from the medium voltage lines.

An inductive coupler in accordance with the present invention is also suitable for use with an overhead power transmission cable. The inductive coupler is generally less expensive than a capacitive coupler, as increasing the thickness of the inductive coupler's insulation does not substantially degrade the coupler performance, while increasing the insulation thickness in the capacitor directly decreases its capacitance per unit area, and necessitates a larger plate area. Therefore, in comparison to a capacitive coupler, the inductive coupler is considerably less expensive to manufacture.

There are several alternative embodiments of the invention. For underground cable, one can enlist one or more of the neutral wires of the underground cable, which can form high frequency transmission lines, while the power conduction function of the selected neutral wire(s) is preserved.

Figure 2A:
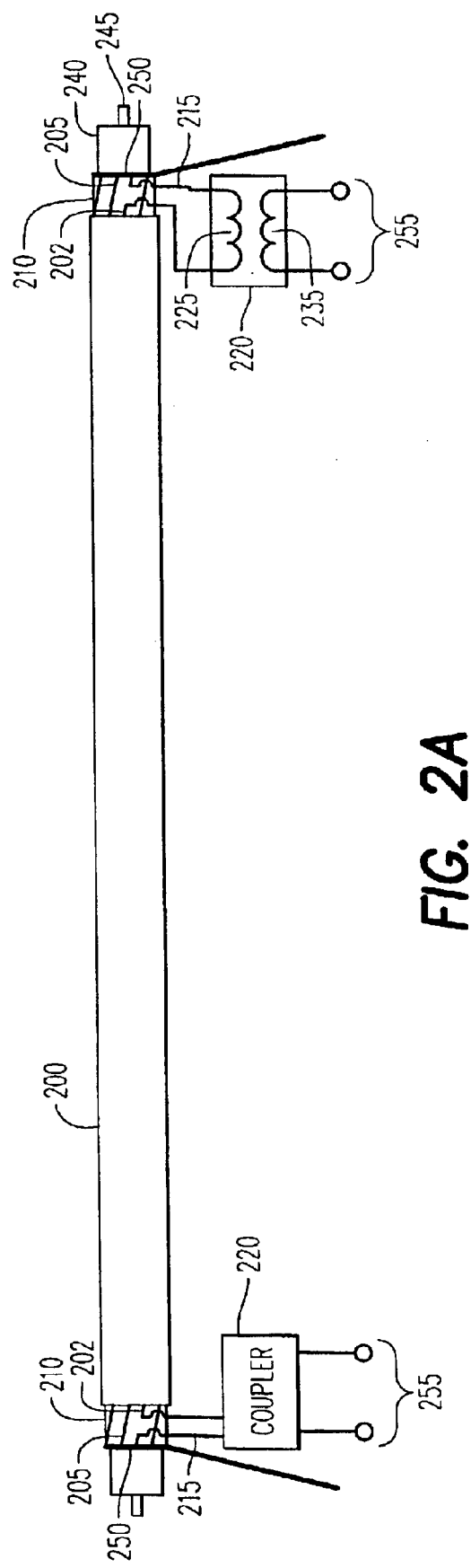
FIG. 2A is an illustration of an arrangement of a single-ended transmission line using a single neutral wire for data communication, in accordance with the present invention.
Figure 2B:
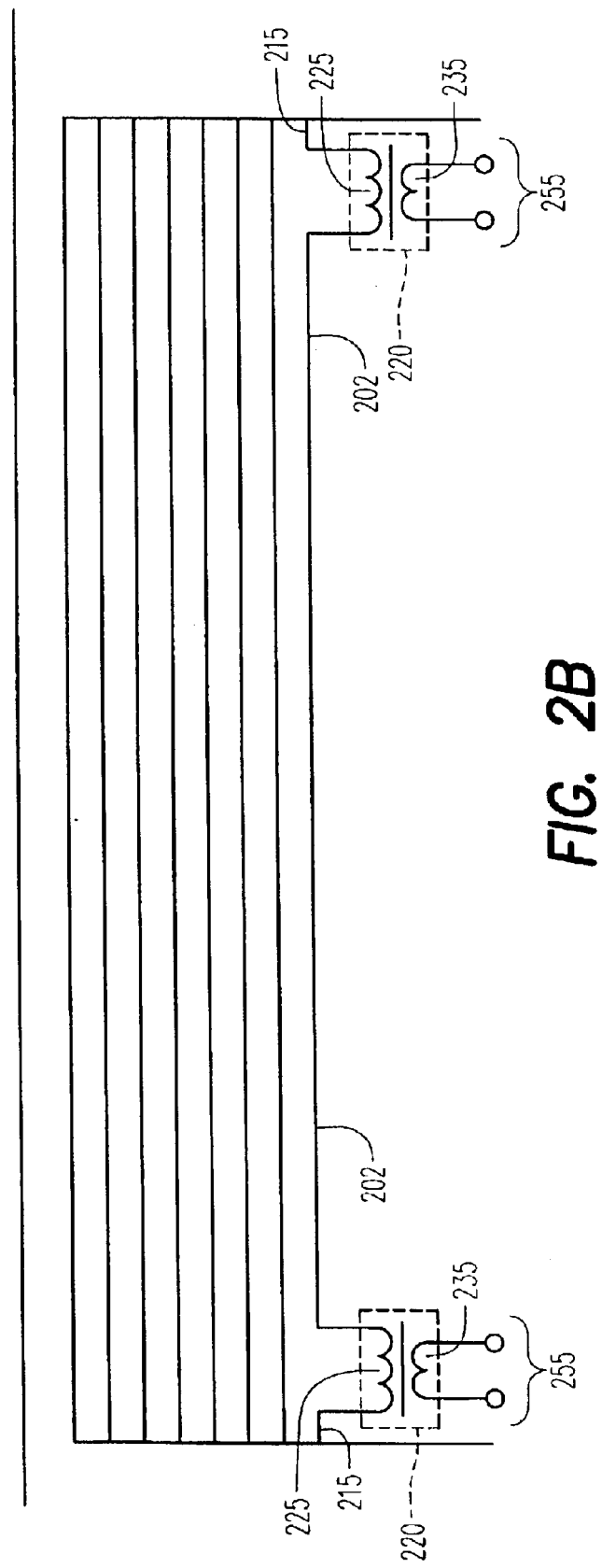
FIG. 2B is a schematic representation of the arrangement of FIG. 2A.

FIG. 2A is an illustration of an arrangement of a single-ended transmission line using a single neutral wire for data communication, in accordance with the present invention. FIG. 2B is a schematic representation of the arrangement of FIG. 2A. A cable 200 includes a multiplicity of neutral conductors 205, e.g. wires, that can be considered as a flat data transmission line, wrapped in a gentle spiral around a high voltage insulator 240 and a center phase conductor 245.

One selected strand of neutral conductors 205, i.e., neutral conductor 202, is isolated to act as a data transmission line conductor for a data signal, and the remaining neutral conductors 205, mainly two neutral conductors 205 that are adjacent to neutral conductor 202, serve as a second data transmission line conductor. For the cross section of the Pirelli cable-described above, the characteristic impedance is estimated to be about 95 ohms with respect to signals in a frequency range of 1–50 MHz, a subrange of which is typically used in a transmission of data.

To implement the arrangement of FIG. 2A in an already-installed underground cable, neutral conductor 202 is selected out of the several neutral conductors 205, and cut in an exposed section 210 at each end of cable 200. A lead 215 of neutral conductor 202 remains connected to a ring 250 at each end of cable 200. Neutral conductor 202 and lead 215 are connected to a first winding 225 of a coupler 220. First winding 225 is thus connected in series between neutral conductor 202 and ground. A second winding 235 of coupler 220 is coupled to a port 255 through which data is transmitted and received. Thus, cable 200 is enlisted for use as a high frequency transmission line, which can be connected to communications equipment such as a modem (not shown), via coupler 220.

Electrically speaking, coupler 220 is a transformer. The impedance across the primary, i.e., first winding 225, of such a transformer is negligible at the frequencies used for conducting power. First winding 225, which is attached to neutral conductor 202 and lead 215, should be wound with a wire at least as thick as that of neutral conductor 202. Under these circumstances, the selected data-carrying neutral conductor 202 has essentially the same impedance as all of the other neutral wires. It would carry essentially the same current as each of the other neutral wires, and the total ampacity and surge current capacity of the neutral circuit would not be degraded.

In FIGS. 2A and 2B, the neutral current of the single neutral conductor 202 passes through coupler 220. For a 200 Amp cable with eight neutral wires, the data-carrying wire would carry a maximum steady state current of 25 Amps rms. The maximum steady-state current through a single neutral conductor is less for a smaller ampacity cable and for a cable with a larger number of neutral conductors. Coupler 220 must be capable of handling the flux generated by this current, without magnetic core saturation, in order to carry out its data coupling function.

Neutral conductor 202 carries current in a first direction for a high frequency data signal. The other neutral conductors 205 carry the data signal's return current in the opposite direction, tending to cancel and thus greatly decrease an intensity of the radiated magnetic field due to the modulated data signal. This arrangement also provides an electrostatic shielding effect against noise coupling from an external electric field.

Figure 3A:
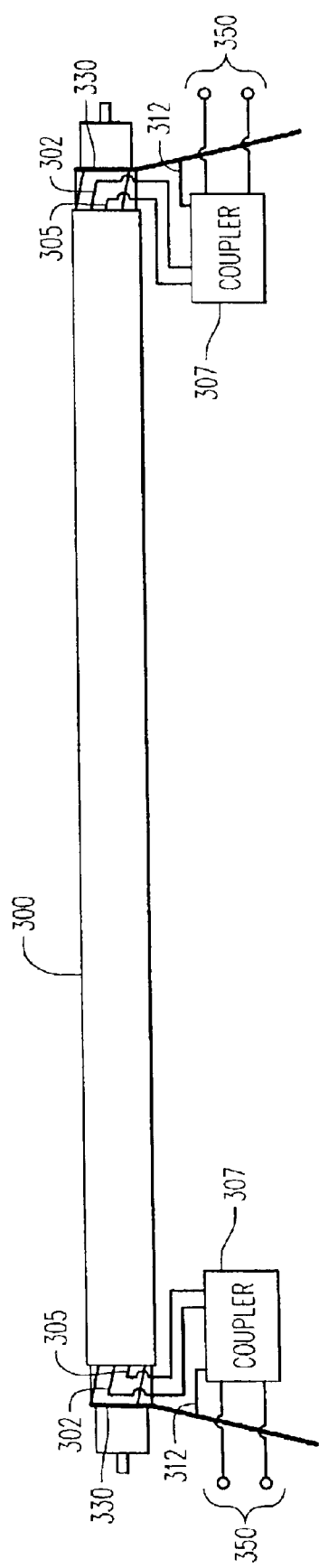
FIG. 3A is an illustration of a power transmission cable in which two neutral wires are used as a transmission line for communication of a data signal, in accordance with the present invention.
Figure 3B:
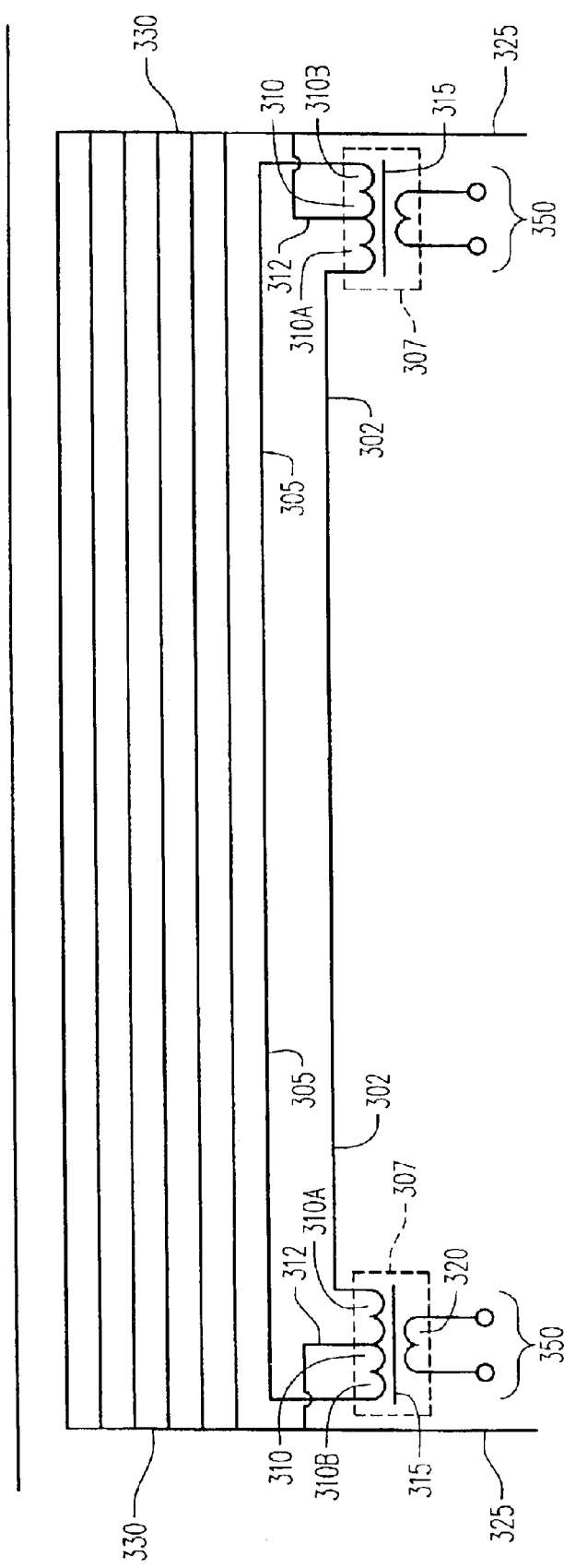
FIG. 3B is a schematic representation of the arrangement shown in FIG. 3A.

FIG. 3A is an illustration of a power transmission cable 300 in which two neutral wires are used as a transmission line for communication of a data signal, in accordance with the present invention. FIG. 3B is a schematic representation of the arrangement shown in FIG. 3A.

A coupler 307, for example, a high frequency transformer, is installed in series with two adjacent neutral wires 302, 305. Neutral wires 302, 305, which are preferably in parallel and adjacent to one another, are cut just before a point where they attach to neutral connecting ring 330.

Referring to FIG. 3B, the leads of neutral wires 302, 305 extending from cable 300 are connected to a first winding 310 of coupler 307. First winding 310 is thus connected in series between neutral conductor 302 and neutral conductor 305. First winding 310 includes a center-tap 312 and a magnetic core 315. Center-tap 312 is connected to neutral connecting ring 330.

A portion 310A of first winding 310 is connected to neutral wire 302 and wound in a first direction around core 315, and a second portion 310B of first winding 310 is connected to neutral wire 305 and wound in the opposite direction around core 315. Portions 310A and 310B are made of wires of slightly larger diameter than the power cable neutral wires, and are therefore capable of carrying steady state and surge currents at least as well as the unselected neutral conductors. Each of portions 310A and 310B may itself be considered a winding.

The arrangement of FIG. 3A ensures that only a negligible impedance is inserted in series with two neutral wires 302, 305, and does not disturb the essentially equal division of power frequency current among all of the neutral wires. For the Pirelli cable described earlier, the characteristic impedance of the parallel wires 302 and 305 acting as a parallel wire transmission line is estimated to be approximately 130 ohms. Also, at power frequency, the arrangement shown in FIGS. 3A and 3B results in flux cancellation due the neutral currents' flowing in opposite directions in windings 310A and 310B, resulting in a negligible net flux through core 315.

Another winding 320 is connected to a port 350 through which data is transmitted and received. Winding 320 is insulated from the power circuit neutral 325, thus avoiding a ground loop that could induce spurious noise and fault surges into the data circuits.

Cable 300 can be thought of as a high frequency transmission line, which can be connected to communications equipment via coupler 307. In this configuration, a data signal is driven differentially through neutral conductors 302, 305. Such a transmission line should emit even lower electromagnetic radiation than the singe-ended arrangement described in FIG. 2A, for a given drive power level.

Figure 3C:
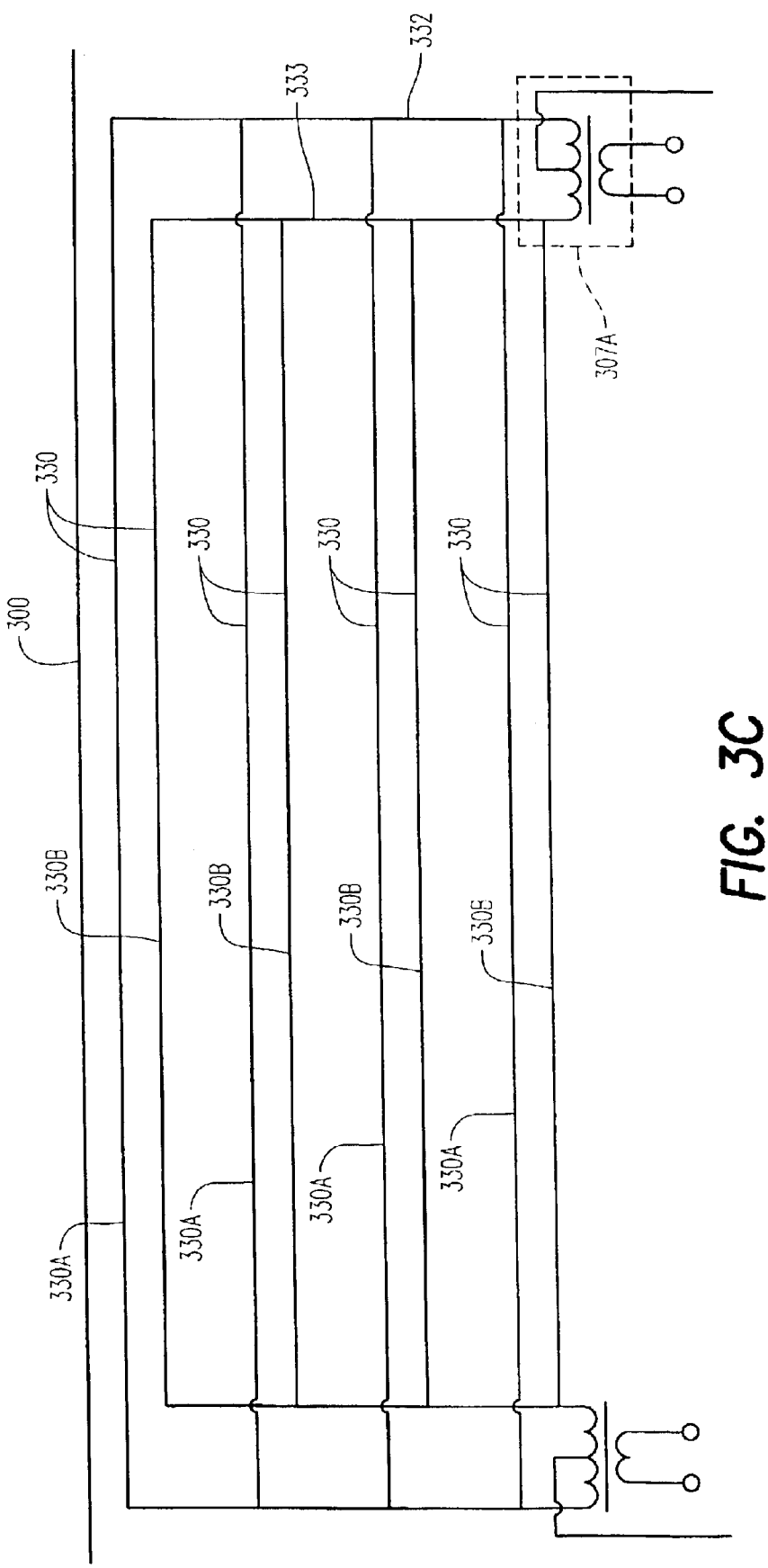
FIG. 3C is a schematic representation of an alternative to the arrangement shown in FIG. 3A using a plurality of neutral wires to form a data transmission line.

FIG. 3C is a schematic representation of an alternative to the arrangement shown in FIGS. 3A and 3B using a plurality of neutral wires to form a data transmission line. Cable 300 has a plurality of neutral wires 330 that are substantially parallel to one another, with individuals of a first subset 330A of the plurality of neutral wires 330 alternating with individuals of a second subset 330B of the plurality of neutral wires 330. The first subset 330A is collectively regarded as a first neutral conductor and joined together to form a first stranded lead 332 to a coupler 307A. The second subset 330B is collectively regarded a second neutral conductor and joined together to form a second stranded lead 333 to coupler 307A. Preferably, the plurality of neutral wires 330 is configured as N/2 transmission lines connected in parallel, where N is the number of neutral wires 330, and N/2 is the number of neutral wires in each of subsets 330A and 330B. The effect of such a parallel connection is to reduce the attenuation produced by cable 300 by a factor of approximately N/2, and to lower the characteristic impedance by the same factor.

Figure 3D:
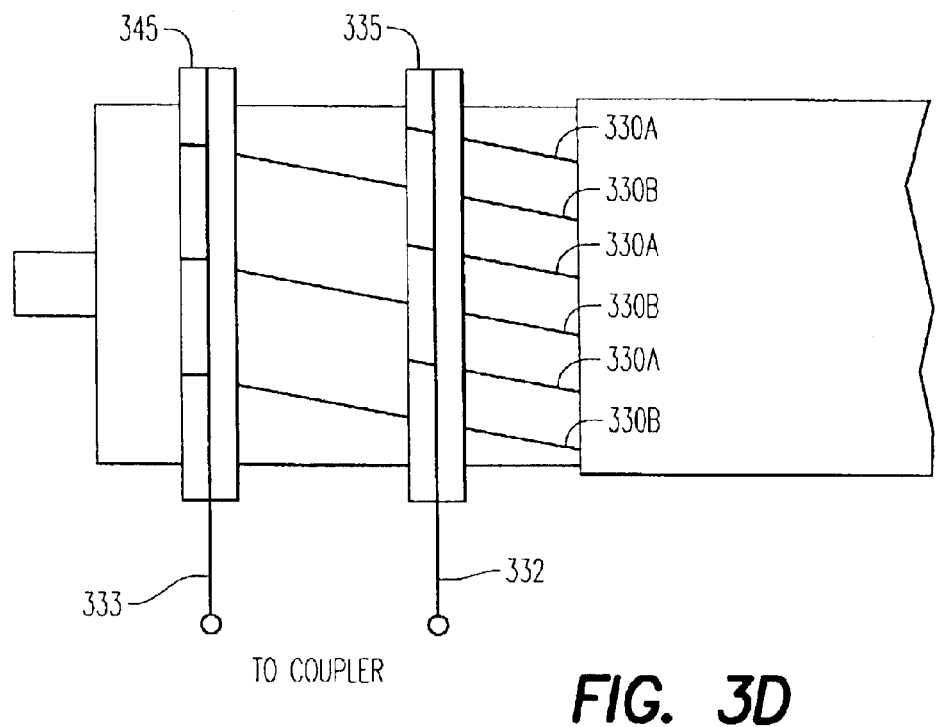
FIG. 3D is an illustration of a technique for implementing the arrangement shown in FIG. 3C.

FIG. 3D is a diagram showing how the arrangement of FIG. 3C may be conveniently implemented. To facilitate the attachment of first subset 330A to first stranded lead 332, a first insulating ring 335 is placed over all neutral conductors, i.e., first subset 330A and second subset 330B, proximate to a point where coupler 307A will be located. First subset 330A is wrapped over first insulating ring 335 and joined together to form first stranded lead 332. Likewise, second subset 330B is wrapped over a second ring 345, which may be insulating or not insulating, and joined together to form second stranded lead 333. The improved geometrical symmetry of the current flow and reduced voltage levels should further reduce electromagnetic radiation, relative to that emitted with the two-wire implementation of FIG. 3A.

An electric utility company might object to cutting two neutral wires and reconnecting them through a coupler. In accordance with the present invention, it is possible to "wind" a magnetic core around the two selected neutral wires in a manner that is topologically and magnetically equivalent to the embodiment shown in FIGS. 3A and 3B.

Figure 4A:
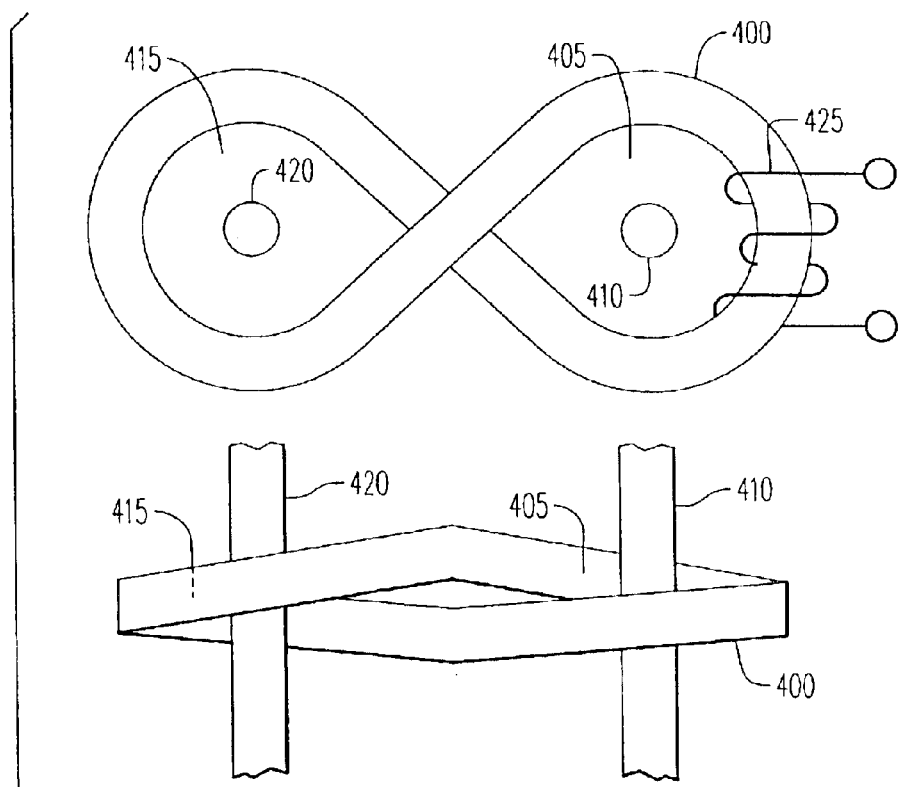
FIGS. 4A and 4B illustrate embodiments of a magnetic core topology for a coupler for use with a pair of neutral conductors that are differentially driven with a data signal.
Figure 4B:
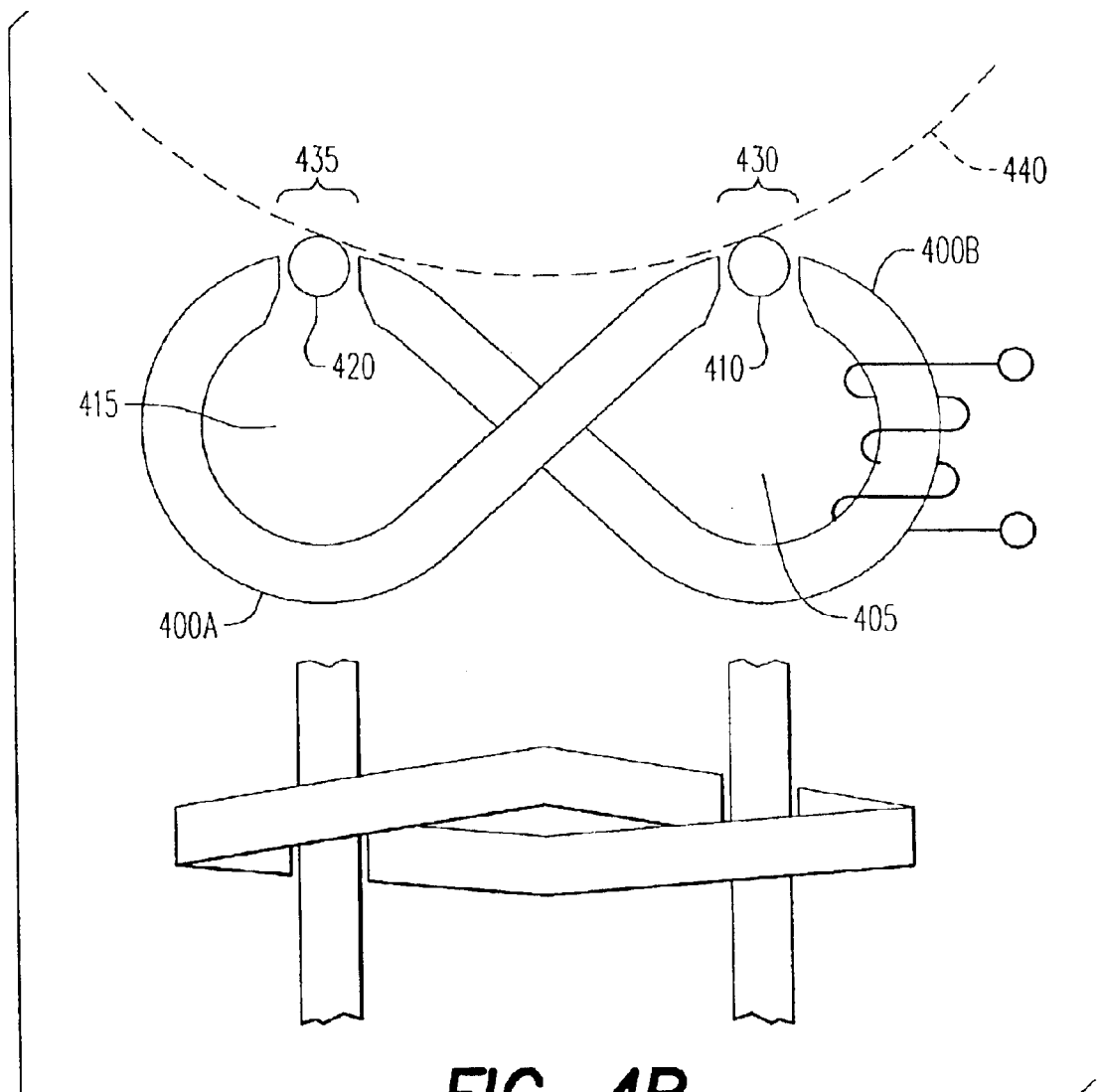

FIGS. 4A and 4B illustrate embodiments of a magnetic core topology for a coupler for use with a pair of neutral conductors that are differentially driven with a data signal. Such a core has a first region adjacent to a first neutral conductor, and a second region adjacent to a second neutral conductor. The coupler includes a winding wound around a portion of the core. Through the core, the winding induces a first current in the first neutral conductor in a first direction, and induces a second current in the second neutral conductor in a second direction that is opposite of the first direction.

Referring to FIG. 4A, a core 400 may be visualized as a figure "8", with no contact at the crossing point. The figure "8" forms a topological "twist". A first region comprises a first loop 405 of the figure "8". A first neutral conductor 410 is routed through first loop 405. A second region comprises a second loop 415 of the figure "8". A second neutral conductor 420 is routed through second loop 415. Core 400 is effectively a contiguous one-window core through which conductors 410 and 420 are passed in opposite directions, thus canceling the flux due to power frequency currents. A winding 425 induces oppositely-phased high frequency signal currents in neutral wires 410 and 420.

The figure "8" topology can be implemented on the surface of a cable, without cutting the neutral conductors. As shown in FIG. 4B, a core comprising core segments 400A and 400B is configured with a first gap 430 in the first loop 405 and a second gap 435 in the second loop 415. Neutral conductor 410 is routed through first gap 430 and neutral conductor 420 is routed through second gap 435. By placing cores 400A and 400B against the insulation 440 of neutral conductors 410 and 420, neutral conductors 410 and 420 are placed within the path of magnetic flux.

Another method for avoiding the physical cutting of the neutral wires is to insert a high impedance for high frequencies in series with them without cutting the wires. The present invention accomplishes this by surrounding the entire cable with one or more magnetic toroid cores.

Figure 5A:
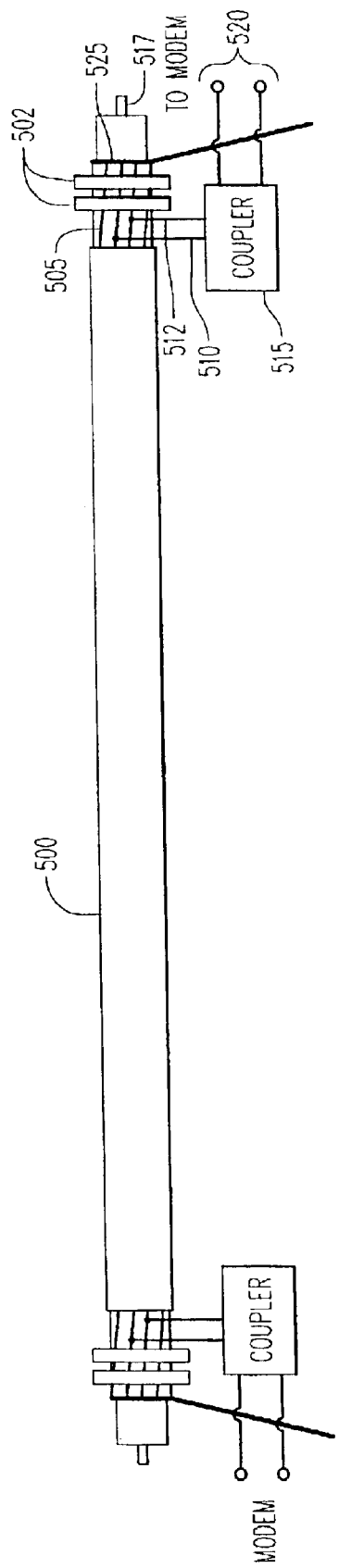
FIG. 5A is an illustration of an arrangement of a cable having a high impedance introduced by placement of a magnetic toroid core.
Figure 5B:
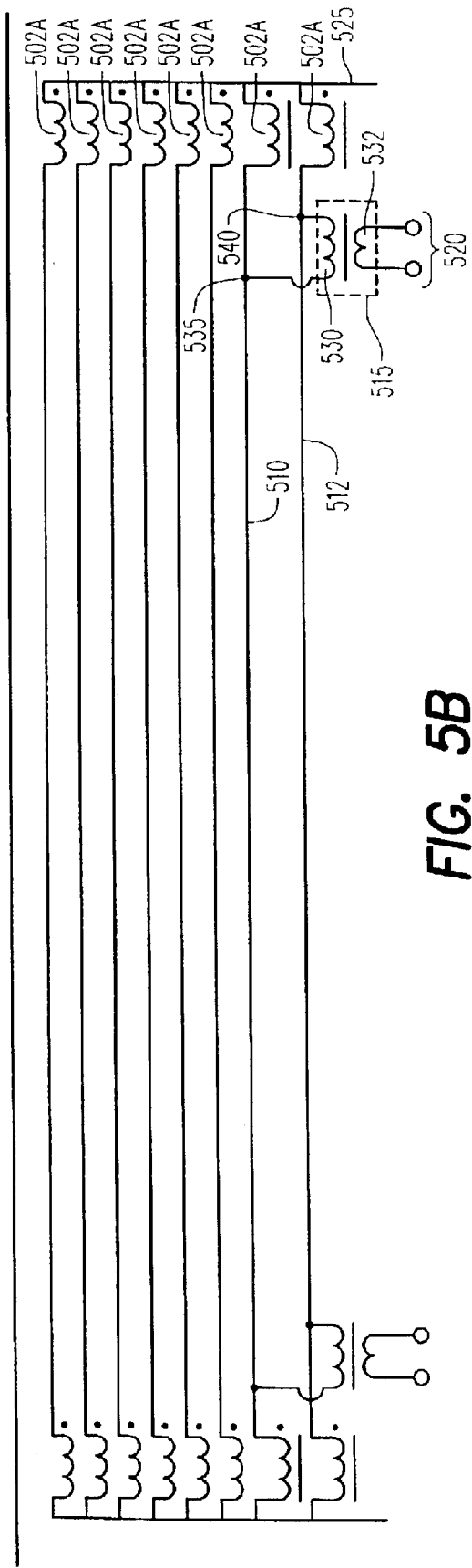
FIG. 5B is a schematic representation of the arrangement of FIG. 5A.

FIG. 5A is an illustration of an arrangement of a cable having a high frequency high impedance introduced by placement of a magnetic toroid core over the cable. FIG. 5B is a schematic representation of the arrangement of FIG. 5A.

One or more magnetic toroid cores 502 are disposed around a portion of a power transmission cable 500. A first winding 530 (FIG. 5B) of a coupler 515 is connected between a first neutral conductor 510 and a second neutral conductor 512, inwards of cable 500 relative to magnetic toroid cores 502. A second winding 532 of coupler 515 provides a data path to a modem port 520.

First and second neutral conductors 510, 512 are two of a plurality of neutral conductors 505 within cable 500. Each of neutral conductors 505 will effectively see a choke 502A (FIG. 5B) just prior to a neutral collection ring 525. Thus, magnetic toroid cores 502 insert an isolating reactance between each of neutral wires 505 and ground, preferably on the order of magnitude of a few micro-Henries.

Magnetic toroid cores 502 may be configured as a split core of two halves, with a mechanical package provided to mate the core halves accurately, and fasten the core to cable 500. The advantage of this embodiment is that none of the neutral wires 505 need be cut during installation of magnetic toroid cores 502.

A data signal can be transmitted to and received from a modem (not shown) connected across a port 520 of coupler 515 and coupled to neutral conductors 510, 512 upstream of magnetic toroid cores 502. Cable 500 can be thought of as a high frequency transmission line with connection end points 535 and 540 partially isolated from ground by toroids acting as chokes.

At power frequency, the net current passing through the magnetic toroid cores 502 is essentially zero, since the phase current of a central conductor 517 flowing in one direction is balanced by the oppositely directed neutral current flowing through the multiplicity of neutral wires 505, all passing through magnetic toroid cores 502. Core saturation is thus obviated. Power current distribution among the neutral wires 505 is remain unchanged by the presence of magnetic toroid cores 502, as a very small reactance is induced by the choking effect of magnetic toroid cores 502, which affect all neutral wires equally.

FIGS. 6A–6C are illustrations of several arrangements of a balanced transmission line using two neutral wires and magnetic induction, in accordance with the present invention. FIG. 6D is a schematic representation of the arrangements of 6A–6C. Again, the advantage obtained is the avoidance of cutting or manipulating the neutral wires, for circuits that may or may not be energized.

Each of the embodiments of FIGS. 6A–6D uses two neutral wires as a transmission line. Signal current is magnetically induced in the sections of the neutral wires, adjacent to a grounded collection ring. An open magnetic core (such as an "E" core) is positioned proximate and perpendicular to the two neutral wires.

As shown in FIG. 6A, an open magnetic core 605 has a first leg 606 positioned proximate and perpendicular to a first one of two neutral wires 602 of a cable 600, a second leg 607 positioned proximate and perpendicular to a second one of neutral wires 602, and a third leg, i.e., common leg 610, located between first leg 606 and second leg 607. Common leg 610 has a winding 608 wound thereabout.

Winding 608 is wound around common leg 610, which is positioned between the two neutral wires 602 of cable 600. This arrangement induces currents in the individuals of neutral wires 602 in opposite directions from each other. A segment 615 (FIG. 6B) of neutral wires 602 terminating together in a grounded collection ring 625 (FIG. 6B) may alternatively be considered a one turn coil passing through the gap between the pole faces of legs 606 and 610, and between the pole faces of legs 607 and 610. Thus, a signal current in winding 608 will induce signal current in the two neutral wires 602, launching a differential signal down the transmission line formed by those two neutral wires 602.

Referring to FIG. 6C, to reduce the size of the relatively large air gap between the legs in standard core shapes (e.g., "E" core), and to increase the coupling coefficient, a pair of magnetic toroidal cores 620 can be used, with gaps 627 provided through which neutral wires 602 are routed. A winding 630 is wound around a portion of each of magnetic toroidal cores 620, e.g., a common leg 632.

The equivalent circuit of the embodiments of FIGS. 6A–6C is shown in FIG. 6D. The sections of neutral wires 602 in which the flux is induced act as two oppositely phased windings 635 connected together at collection ring 625. A winding 645 provides a port 640 for a connection to a modem (not shown).

Power frequency magnetomotive force (MMF) is canceled in the common leg of the core, but appears in full on each side leg. However, the air gap, which must be larger than the diameter of a neutral wire, would usually prevent these side legs from becoming saturated.

The advantage of the embodiments of FIGS. 6A–6D is an avoidance of both interruption and physical contact with the neutral wires 602. Current distribution among the neutral wires at power frequency would remain essentially unchanged, as the very small reactance induced by the core's choking affect would introduce a negligible reactance compared to the overall neutral wire impedance over the entire cable segment. Cable 600 can be thought of as a high frequency transmission line, connected at each terminus via a coupler, to communications equipment.

Figure 7:
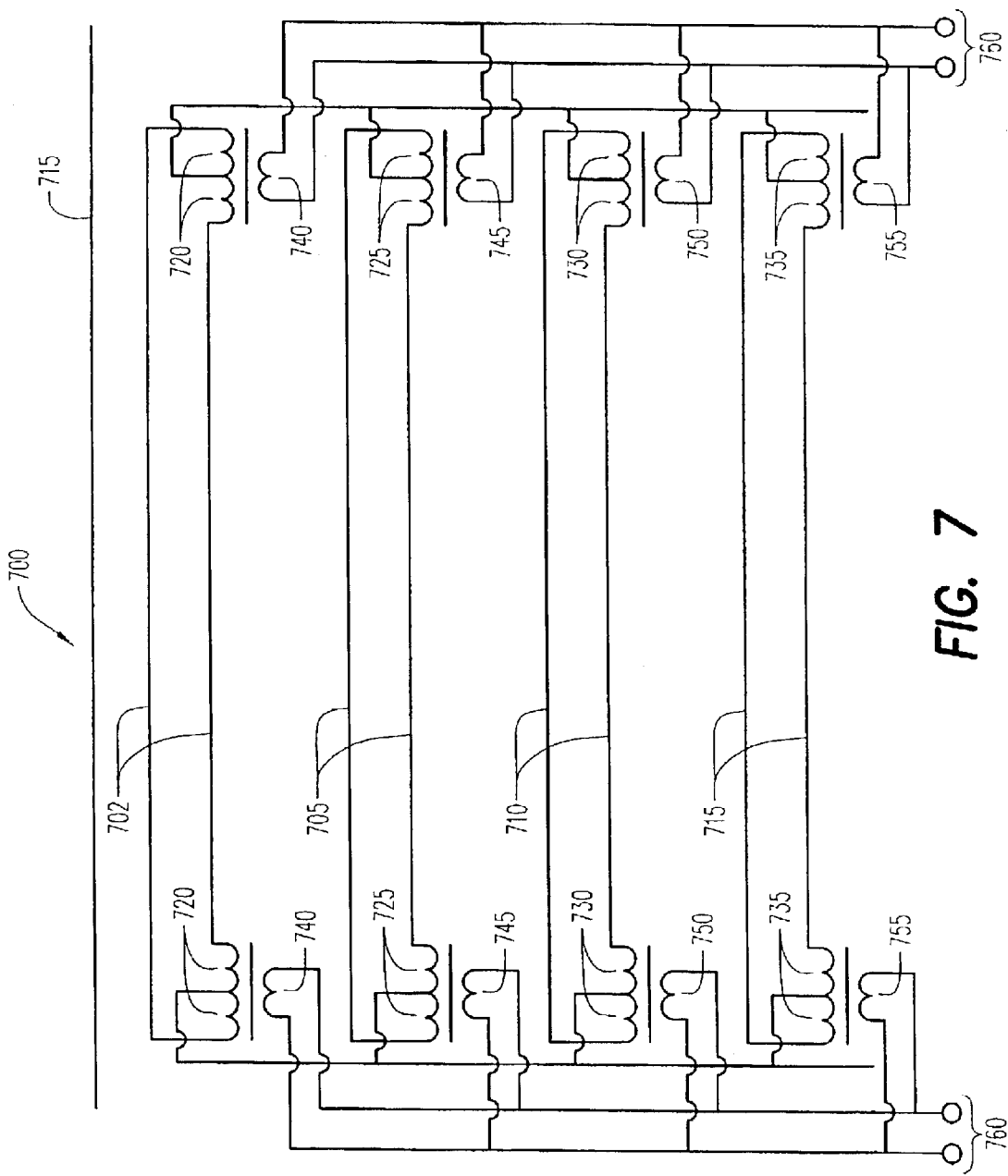
FIG. 7 is a schematic of a balanced transmission line using a magnetic induction, in accordance with the present invention.

FIG. 7 is a schematic of a balanced transmission line using a magnetic induction, in accordance with the present invention. This embodiment is similar to that of FIG. 6D, but instead of a single magnetic core or pair of toroids coupling to one pair of neutral wires, it couples to all neutral wires, organized as pairs. For a cable with an odd number of wires, one wire would be left-unused. To achieve this, any of the embodiments of FIGS. 6A–6D may be employed, with the number of couplers equaling the number of neutral wire pairs, and the windings of the couplers connected together. For minimum radiation, alternate neutral wires should be oppositely phased.

Similar to the embodiments of FIGS. 6A–6D, the embodiment of FIG. 7 includes a coupler having a first winding 720 for coupling a data signal via a first neutral conductors 702 of a power transmission cable 700 and a second winding 740, inductively coupled to first winding 720, for coupling the data signal via a data port 760. Generally, the embodiment of FIG. 7 enhances this to include a third winding 725 for coupling the data signal via a second neutral conductor 705 of power transmission cable 700, and a fourth winding 745, inductively coupled to third winding 725, for coupling the data signal via data port 760. The data signal travels in a first path via first neutral conductors 702, first winding 720 and second winding 740, and in a second path via second neutral conductor 705, third winding 725 and fourth winding 745. The first path is in parallel with the second path.

FIG. 7 illustrates the use of all pairs of neutral wires, according to the embodiment of FIG. 6D. Wire pairs 702, 705, 710 and 715 all perform as transmission lines, in a manner similar to the selected pair 600 of FIG. 6D. The segments of the neutral wires passing through the magnetic flux of the cores act as windings 720, 725, 730 and 735, and drive the neutral wire pairs as transmission lines. Windings 740, 745, 750 and 755 may be connected in parallel, as shown, or in any series or parallel combination providing consistent phasing, to provide a data signal to a port 760. Since a central phase conductor 715 of power cable 700 is exposed to equal and oppositely phased flux from the coupling coils, phase conductor 715 does not affect the signal transmission.

Some of the advantage of the embodiment of FIG. 7 are (a) the installation of a coupler can be performed without selecting a pair of neutral conductors, and therefore without identifying those conductors at the far end of the segment (note that a phase inversion is possible here, but would not affect data flow, as modems can tolerate phase inversion of the entire signal), (b) data transmission is possible, even if cable 700 is damaged during its run, and some of the neutral wires are accidentally grounded, (c) better cancellation of external fields and lower radiation, and (d) lower path loss over the cable segment.

Figure 8:
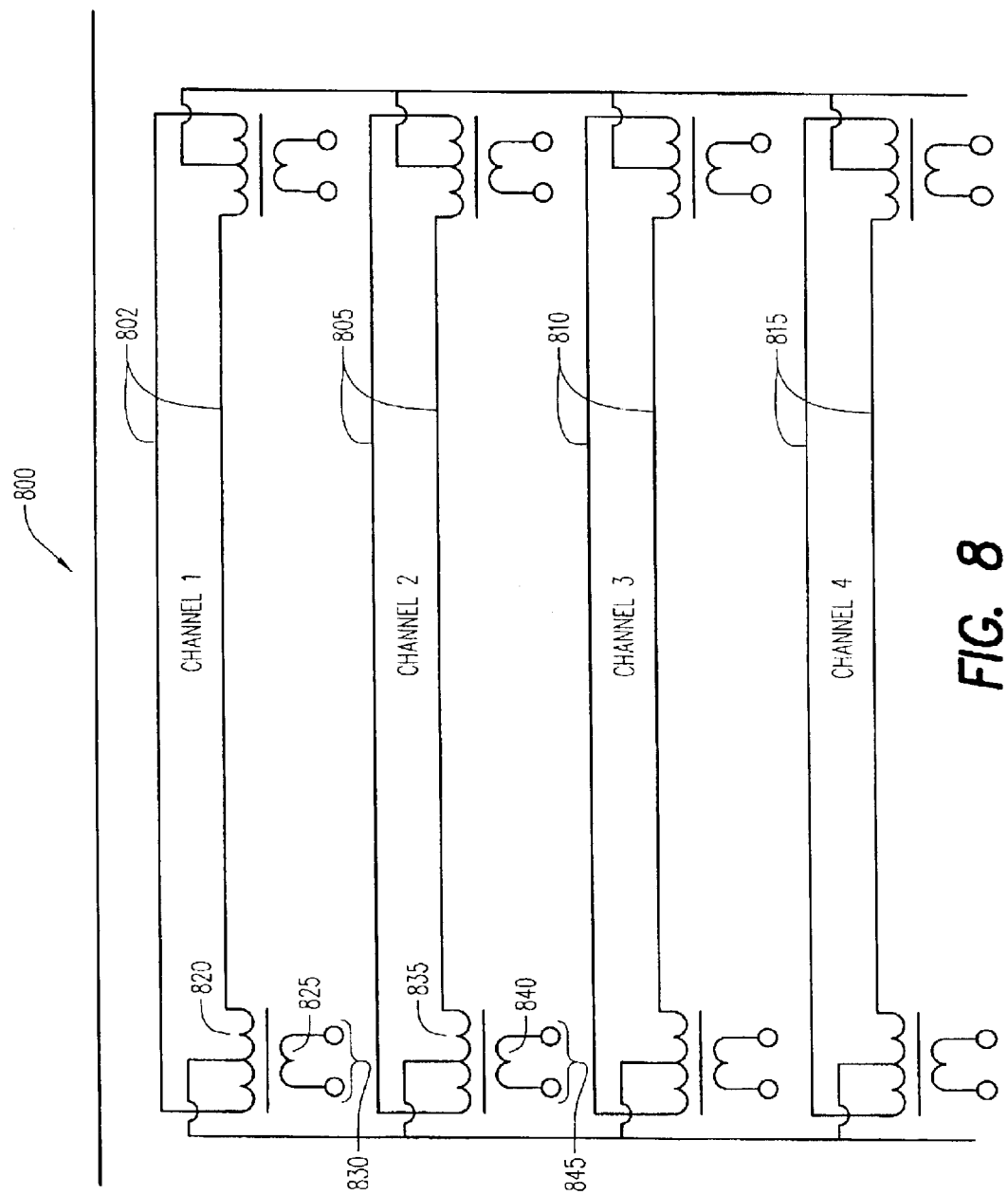
FIG. 8 is a schematic of an embodiment of the present invention using multiple transmission lines with multiple sets of neutral wires.

FIG. 8 is a schematic of an embodiment of the present invention using multiple transmission lines with multiple sets of neutral wires. This embodiment utilizes any of the embodiments represented in FIGS. 6A–6D, but instead of a single signal path, it exploits a multiplicity of neutral wire transmission lines 802, 805, 810, 815 to provide multiple independent transmission channels. FIGS. 8 shows four transmission channels.

Similar to the embodiments of FIGS. 6A–6D, the embodiment of FIG. 8 includes a coupler having a first winding 820 for coupling a data signal via a first neutral conductor 802 of a power transmission cable 800 and a second winding 825, inductively coupled to first winding 820, for coupling the data signal via a data port 830. Generally, the embodiment of FIG. 8 enhances this to include a third winding 835 for coupling a second data signal via a second neutral conductor 805 of power transmission cable 800, and a fourth winding 840, inductively coupled to third winding 835, for coupling the second data signal to a second data port 845.

Such a multiplicity may be exploited for achieving (a) full duplex transmission of data on one or more channels, (b) multiple unidirectional or bi-directional channels, thus increasing overall bandwidth, (c) redundant transmission of data to minimize errors, (d) implementing multi-wire interfaces that have separate clock, strobe and data lines, and (e) use of one channel for supervisory commands, error notification, or other data useful in network management.

For each of the embodiments shown in FIGS. 6A–6D, and for the enhancements shown in FIGS. 3–8, selection of one or two neutral wires at one end of a cable implies that the same wires must be identified at the distal end of the cable.

Figure 9B:
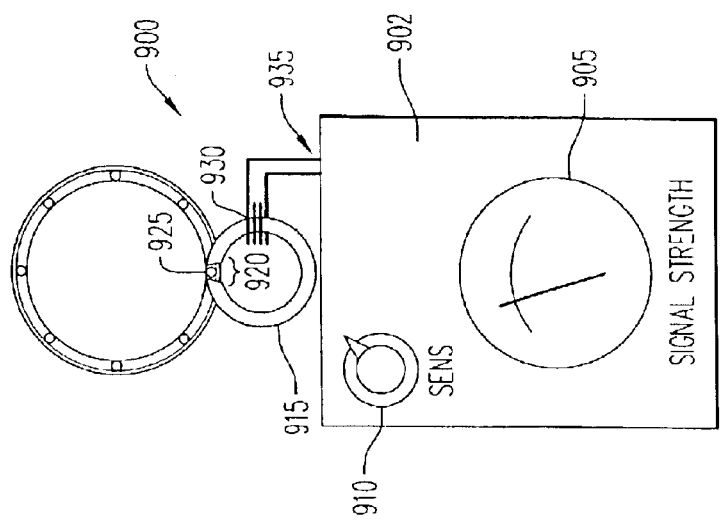
FIG. 9B is an illustration of a system for identifying one of a plurality of wires of a power transmission cable.
Figure 9A:
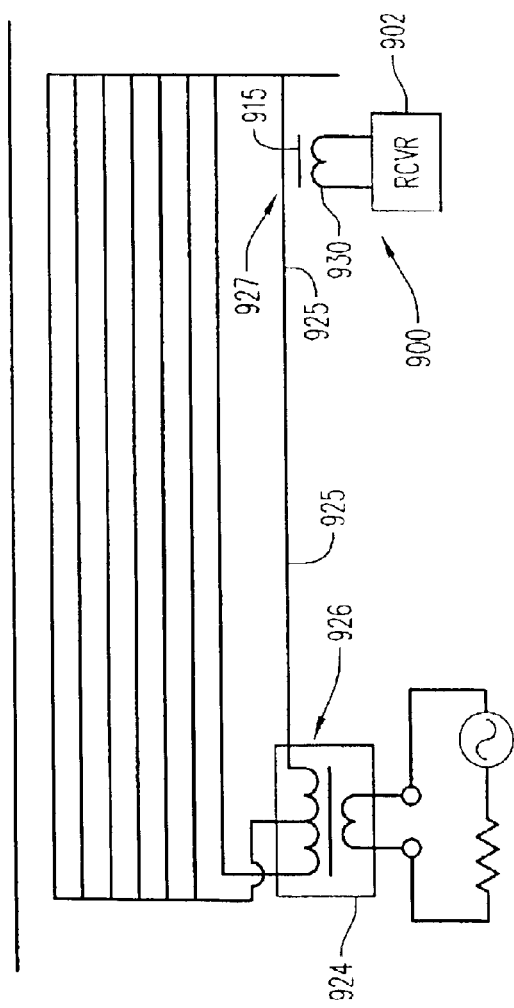
FIG. 9A is a schematic of a system for identifying one of a plurality of wires of a power transmission cable.

FIG. 9A is a schematic, and FIG. 9B is an illustration, of a system 900 for identifying one of a plurality of wires of a power transmission cable. System 900 includes a receiver 902 for sensing a signal from a selected neutral wire of the power transmission cable, and an indicator 905 of a magnitude of the signal. The signal is applied to a selected wire 925 at a first point 926 on the power transmission cable. Receiver 902 senses the signal at a second point 927 on the power transmission cable that is remote from the first point.

System 900 also includes a ferrite toroid 915 having a radial slot 920 through which the selected neutral wire 925 is routed, and a winding 930 that is wound around a portion of ferrite toroid 915 and connected to an input 935 of receiver 902. The signal is inductively coupled from the selected neutral wire 925 via the ferrite toroid 915. The signal is applied to the selected neutral wire 925 at first point 926 via an inductive coupler 924.

At the first cable end to be connected, the wire(s) are selected, and a coupler attached. FIG. 9A shows a pair of neutral wires being selected. The coupler is driven by a low power, high frequency oscillator, typically in the MHz range. This causes high frequency current to flow most strongly in the wire(s) selected.

At the distal end, radio receiver 900 is tuned to the same frequency. This radio receiver is special in that it is equipped with a signal strength meter 905 and manual or automatic gain control 910 for optimizing the gain. In addition, the receiver's antenna comprises a ferrite toroid 915 with a radial slot 920 slightly greater than the diameter of the neutral wire 925, and a coil wound on the toroid 915 connected to the receiver's antenna input terminals 935. Preferably, toroid 915 is fixed-mounted onto the receiver case.

The installer holds the receiver so as to orient the slot to be in line with and proximate to neutral conductor 925 and observes the reading on the signal strength meter 905. The installer then moves the receiver tangentially around the cable, sensing each wire in turn. The wire(s) producing the maximum reading on the signal strength meter will be those directly excited at the other end of the cable.

Accordingly, a method for identifying one of a plurality of neutral wires of a power transmission cable, comprises the steps of (a) applying a signal to a selected neutral wire, at a first point on the power transmission cable, (b) sensing a relative magnitude of the signal on each of the plurality of neutral wires at a second point on the power transmission cable that is remote from the first point, and (c) identifying the selected neutral wire from the relative magnitudes. The identifying step identifies the selected neutral wire as the one of the plurality of neutral wires having a greatest relative magnitude. The applying step comprises inductively coupling the signal to the selected neutral wire, and the sensing step comprises inductively coupling the signal from the selected neutral wire.

Thus far, the present invention has been described in the context of a cable with multiple, separate, mutually insulated neutral wires. However, many power distribution networks do not use cables with mutually insulated neutral wires, but rather have their neutral wires in the form of a mesh or multiple wires connected together with conducting copper tape. FIGS. 10A, 10B, 11A and 11B and their associated descriptions, relate to an application of the present invention for other common medium voltage power girds, such as those carried on overhead wires and those carried on pseudo-coaxial underground cables with a single neutral conductor.

A coupler that avoids physical contact with a medium voltage phase conductor is desirable in that such a coupler would not need to withstand steady state and surge voltages of the phase conductor, thus simplifying construction and reducing cost of the coupler. However, the use of the currently proposed inductive coupler presupposes a circuit continuity through which current may flow, whilst the medium voltage circuits may include either physically open circuits at their ends, or be connected to transformer windings whose high impedance at radio frequencies may approximate the effect of an open circuit termination. In accordance with the present invention, inductive couplers can be used in a medium voltage data backhaul network when high frequency terminations are added using capacitive-coupled ports at the ends of the cable, and, in a large distribution network, also at a one or more intermediate positions. The phase conductors of underground power transmission lines can be used as data transmission lines when they are equipped with load terminations effective at the high frequencies used for communications for coupling data signals to and from the transmission lines.

In power distribution systems, the medium voltage grid is attached to devices that present an impedance much higher than the cable's characteristic impedance to signals at high frequencies. Such devices effectively appear as open circuits to high frequency signals. Coupling modulated data packets onto such an open-circuited cable would result in a large fraction of a coupled wave being reflected from the ends of the cable, and possibly being interpreted by data receivers as new packets. A further undesirable feature of such reflections would be to mislead the data receivers into concluding that new packets are occupying the cable, and "carrier sense" types of shared networks would suffer a loss of available transmission time.

For cables and wires with significant high frequency losses, these reflections would quickly dissipate, and not cause problems. However, for both overhead lines and some underground pseudo-coaxial lines, the losses are low, and strong reflected signals may interfere with the direct signals.

Figure 10A:
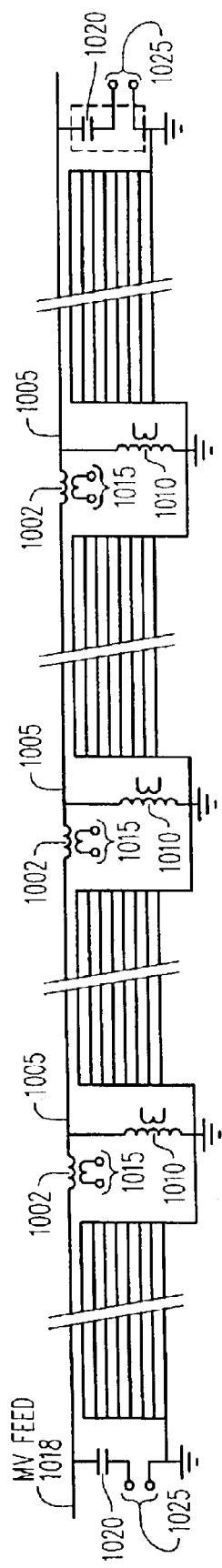
FIGS. 10A and 10B are schematics of portions of a data communication network implemented over a power distribution system, where the data is carried on a phase conductor of the power distribution system, in accordance with the present invention.
Figure 10B:
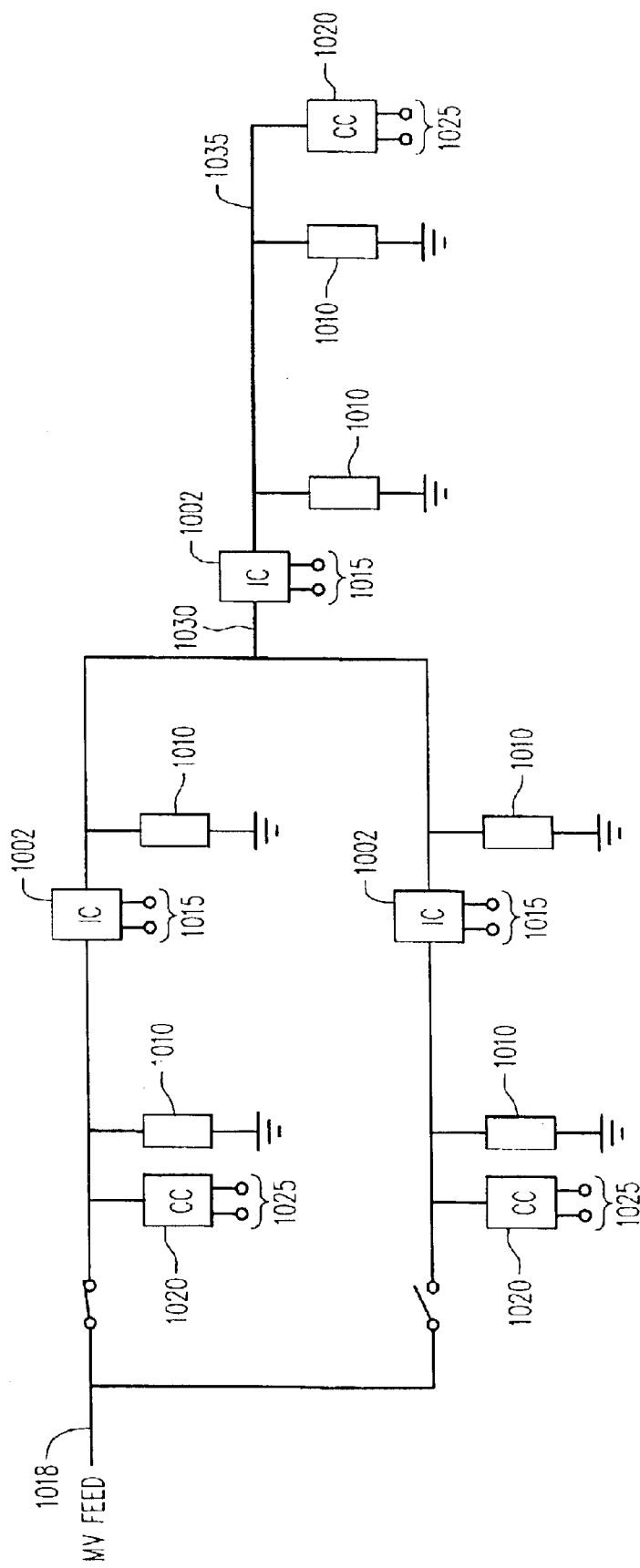

FIGS. 10A and 10B are schematics of portions of a data communication network implemented over a power distribution system, where the data is carried on a phase conductor of the power distribution system. The present invention uses a combination of inductive and capacitive couplers. As explained below, the network includes (a) an inductive coupler for coupling a data signal via the phase conductor, and having a data port for further coupling of the data signal, and (b) a capacitive coupler, connected between the phase conductor and ground, proximate to an end of the power transmission cable, for absorbing reflections of the data signal and optionally serving as a data port for coupling of the data signal.

Inductive couplers 1002 are used at intermediate nodes 1005 proximate to a distribution transformer 1010. Each inductive coupler 1002 provides a port 1015 for connection to a modem (not shown) over a low voltage network being powered from the secondary of each distribution transformer 1010. Capacitive couplers 1020 are connected between an end of a wire or cable and a local ground, to both absorb reflections and provide signal coupling nodes 1025. That is, a signal coupling node 1025 is located between a capacitive coupler 1020 and ground, for coupling the data signal between the phase conductor and for providing another data port for the data signal.

The "end of the wire or cable" includes a point 1018 where power is fed into the cable from a high voltage to medium voltage transformer. In loop topologies, the cable returns to this location but reaches a dead end. Capacitive couplers 1020 are included at such "dead ends". Should a T-branch 1030 produce a stub 1035 in the power network, a capacitive coupler 1020 is used to terminate the distal end of stub 1035.

Figure 11A:
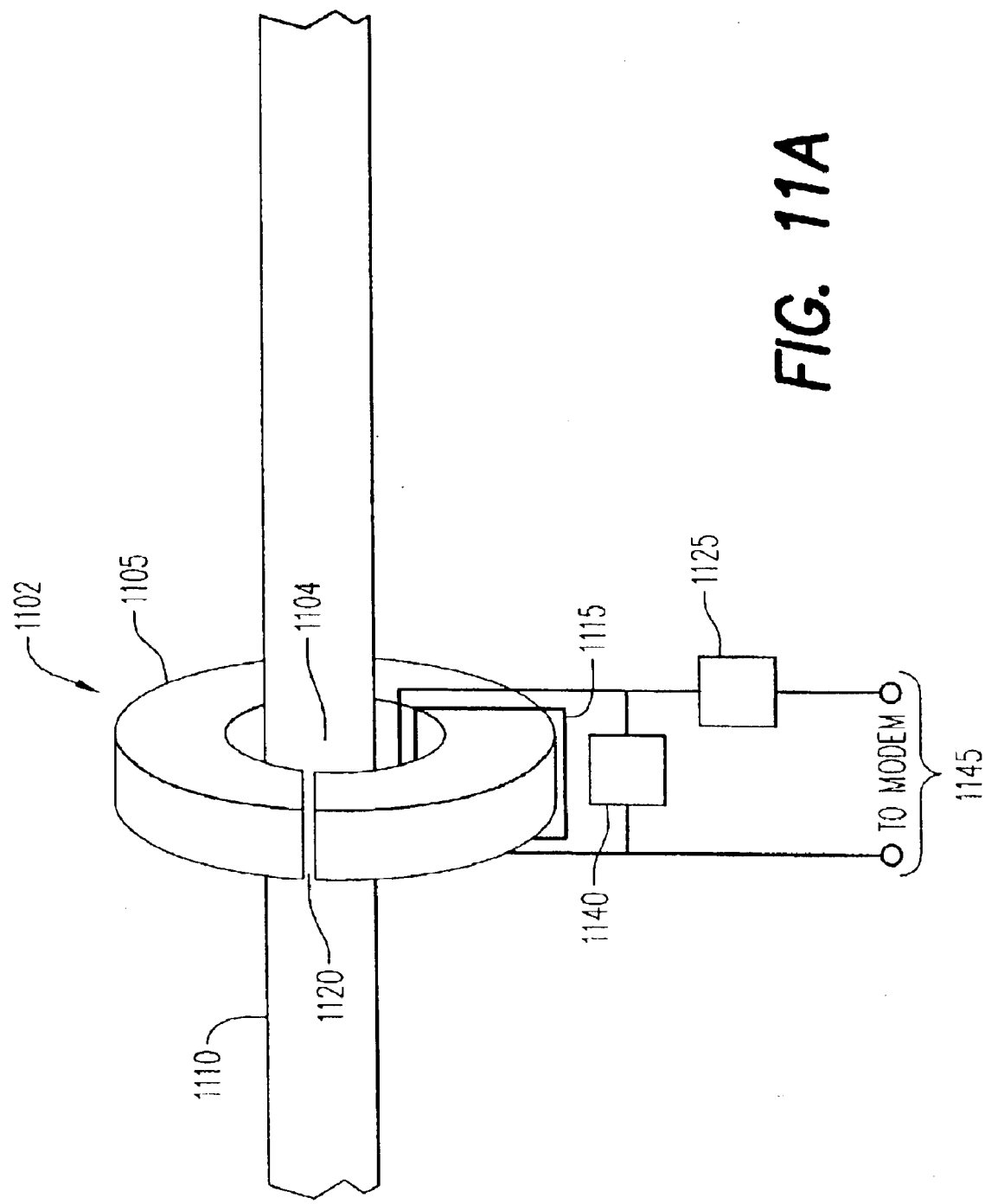
FIG. 11A is an illustration of an embodiment of an inductive coupler for coupling data via a phase conductor, in accordance with the present invention.
Figure 11B:
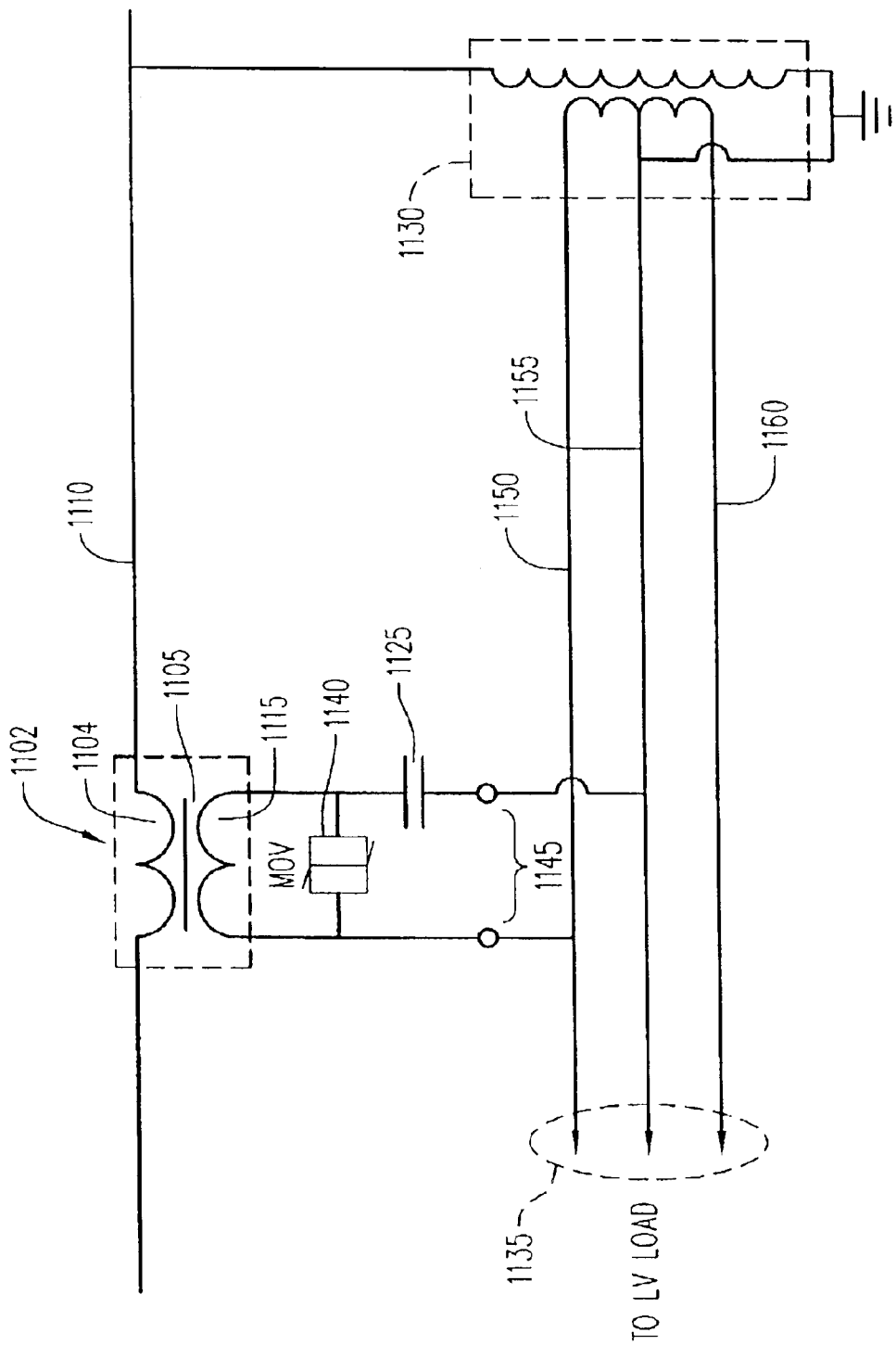
FIG. 11B is a schematic representation of the embodiment shown in FIG. 11A.

FIG. 11A is an illustration of an embodiment of an inductive coupler 1102 for coupling data via a phase conductor, in accordance with the present invention. FIG. 11B is a schematic representation of the embodiment shown in FIG. 11A.

An inductive coupler 1102 includes a first winding 1104 for coupling the data signal via a phase conductor 1110, and a second winding 1115, inductively coupled to first winding 1104, for coupling the data signal via a data port 1145. Inductive coupler 1102 includes a core 1105 through which phase conductor 1110 is routed. This configuration of phase conductor 1110 through core 1105 serves as first winding 1104, i.e., a winding of a single turn. Second winding 1115 is wound around a portion of core 1105.

Inductive coupler 1102 is a current transformer in which core 1105 is placed over a segment of phase conductor 1110. Inductive coupler 1102 can also be used with an underground cable by placing core 1105 over a segment of an underground cable that is not also covered by a neutral conductor sheath, with the power cable phase wire passing through core 1105 as a one-turn winding.

Core 1105 is made of ferrite or other soft magnetic material with substantial permeability and relatively low loss over the frequency range required for the modulated data. Core 1105 has an air gap 1120 sufficient to allow operation of the inductive coupler 1102 without saturation, even when current through phase conductor 1110 is as high as the maximum current for which conductor 1110 is rated, e.g. 200 amps rms.

Inductive coupler 1102 has a primary magnetization inductance sufficient to present appreciable high frequency impedance to a modem transmitter over a relevant frequency range, but negligible impedance at power distribution frequencies. Inductive coupler 1102 has both a leakage inductance and a reflected-primary impedance much lower than the characteristic impedance of the transmission line of which phase conductor 1110 is a component, over the relevant frequency range.

Inductive coupler 1102 has a high voltage capacitor 1125 in series with second winding 1115 and data port 1145, and connected to a low voltage output, i.e. power line output, of a distribution transformer 1130, to prevent second winding 1115 from short circuiting a low voltage power circuit 1135. Thus capacitor 1125 couples a data signal between second winding 1115 and the power line output.

Inductive coupler 1102 also has a surge protector 1140 connected in parallel with second winding 1115, to protect the low voltage circuit 1135, and any electronic communications equipment attached to thereto, from being affected by a high amplitude pulse that might appear on phase conductor 1110 and be coupled by inductive coupler 1102 onto the low voltage lines.

Note that while only one LV phase line 1150 and LV neutral line 1155 are connected to coupler 1102, the other phase line 1160 will receive a slightly attenuated signal via capacitive and inductive coupling, over the length of the LV drop lines.

An important consideration, and a desirable objective, is a minimization of electromagnetic radiation from the wires and cables used for transmission of data. These lines could radiate electromagnetic interference, even if buried a few feet underground. Spurious resonances might also prevent transmission over certain narrow frequency bands.

One or more techniques should be employed to minimize radiation, tolerate resonances, and provide a robust and reliable data channel. Options for minimizing radiation include:

(A) Using spread spectrum modulation in the modems connecting to and from the medium voltage grid. Spread spectrum modulation employs a relatively low spectral power density (e.g. −55 dBm/Hz).

(B) Minimizing the power level of the modulated data. The power level should to be high enough to overcome any noise on the line, and any self-generated equipment noise, e.g., internal noise, amplifier noise, etc. By exploiting the relative isolation of the medium voltage line from the noisy low voltage and high voltage grids, line noise can be minimized. This can be accomplished by placing back-to-back modems at each inductive coupler. Back-to-back modems are for the purpose of regenerating a bit stream and remodulating the data transmission over an additional medium.

Figure 12:
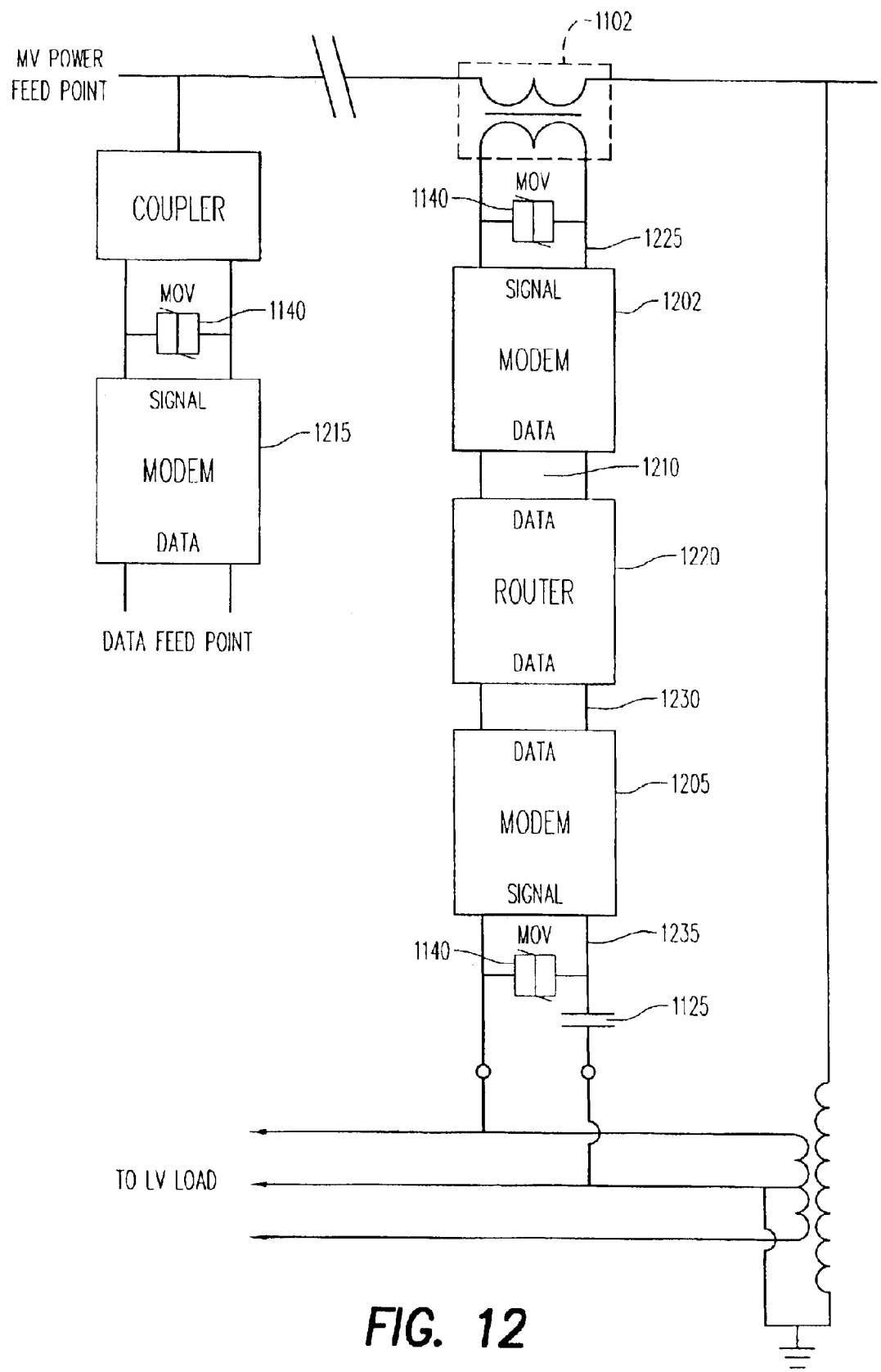
FIG. 12 is a schematic of a portion of a network having back-to-back modems at an inductive coupler.

FIG. 12 is a schematic of a portion of a network having back-to-back modems at an inductive coupler. A first modem 1202 has a first port 1225 coupled to a data port of a second winding of an inductive coupler 1102 for sending and receiving a modulated data signal, and a second port 1210 for further coupling of the digital data. A second modem 1205 has a first digital data port 1230 coupled to the second port 1210 of first modem 1202, and a second port 1235 for further coupling of the modulated data signal. Optionally, a router 1220 may be interposed between first modem 1202 and second modem 1205.

The advantages of the above arrangement are:
A) The noise of the LV grid does not reach the MV grid. Isolation can further be enhanced by optical isolators in series with the data connection 1210.

B) A spread spectrum or other modem, which uses different technology or parameters than the MV modem, can be optimized for LV grids. The inductive couplers introduce additional series impedance at the coupling nodes that is small relative to the wire or cable's characteristic impedance, thus minimizing both reflections and power absorption. In this case, the modulated data may traverse a large number of intermediate nodes successfully. Preferably, the magnetization and leakage inductances are small enough to low voltage and high grids, line noise can be minimized. This can be accomplished by placing back-to-back modems at each inductive coupler. Back-to-back modems are for the purpose of requesting a bit stream and remodulating the data transmission over an additional medium.

FIG. 12 is a schematic of a portion of a network having back-to-back modems at an inductive coupler. A first modem 1202 has a first port 1225 coupled to a data port of a second winding of an inductive coupler 1102 for sending and receiving a modulated data signal, and a second port 1210 for further coupling of the digital data. A second modem 1205 has a first digital data port 1230 coupled to the second port 1210 of first modem 1202, and a second port 1235 for further coupling of the modulated data signal. Optionally, a router 1220 may be interposed between first modem 1202 and second modem 1205.

The advantages of the above arrangement are:
A) The noise of the LV grid does not reach the MV grid. Isolation can further be enhanced by optical isolators in series with the data connection 1210.
B) A spread spectrum or the other modem, which uses different technology or parameters than the MV modem, can be optimized for LV grids. The inductive couplers introduce additional series impedance at the coupling nodes that is small relative to the wire or cable's characteristic impedance, thus minimizing both reflections and power absorption. In this case, the modulated data may traverse a large number of intermediate nodes successfully. Preferably, the magnetization and leakage inductances are small enough to minimize impedance disturbance but large enough to provide sufficient coupling. Implied here is an intentional impedance mismatch between the modem and the impedance presented by the coupler.
C) Routers and other networking equipment 1220 can be employed for mediating between the home and external network.

One parameter at issue for minimizing radiation is an attenuation of signal level in a direction between line and coupler, as the signal level on the medium voltage power line must be strong enough to overcome this attenuation. Attenuation in the direction between coupler and line may be easily overcome without additional radiation by applying more power to the coupler driving the line so as to establish the maximum permissible transmitted power level consistent with compliance to maximum allowed radiation levels.

For example, if each coupler is designed for a 10 dB coupling loss, then the transmitted power may be increased by 10 dB to compensate, and only the second coupler's 10 dB is deducted from the modem's loss budget.

Figure 13:
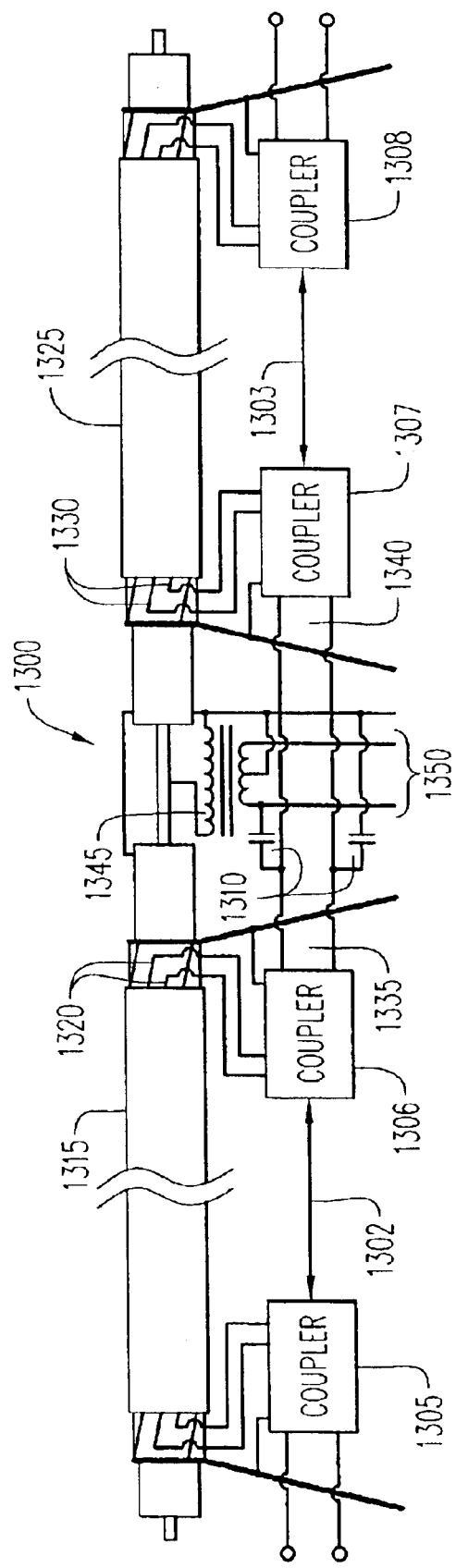
FIG. 13 is a schematic of a technique for passively coupling modulated data between segments of a power grid, in accordance with the present invention.

FIG. 13 is a schematic of a technique for passively coupling modulated data between segments of a power grid, in accordance with the present invention. FIG. 13 shows a data communication network 1300 implemented over a power distribution system having a first segment 1302 with a first neutral conductor 1320, and a second segment 1303 with a second neutral conductor 1330. Network 1300 includes a first coupler 1306 for inductively coupling a data signal via first neutral conductor 1320, and having a data port 1335 for further coupling of the data signal, and a second coupler 1307 having a data port 1340 coupled to data port 1335 of first inductive coupler 1306, and for inductively coupling the data signal via second neutral conductor 1330.

First segment 1302 includes a first power distribution cable 1315 on a first side of a power distribution transformer 1345. Second segment 1303 includes a second power distribution cable 1325 on a second side of power distribution transformer 1345. Power distribution transformer 1345 has an output to power line 1350. Network 1300 further comprises a capacitor 1310 between data port 1335 of first inductive coupler 1306 and output power line 1350, for coupling the data signal to output power line 1350.

Each transformer-to-transformer segment becomes a separate link in a multi-link chain. A coupler is attached to each cable termination, thus requiring two couplers per transformer, except for the last transformer on a dead end segment.

Passive chaining of segments is achieved by connecting the data ports 1335 and 1340 of the two couplers on either side of a transformer to each other. A passive connection to the communications devices attached to LV line 1350 is made through series coupling capacitors 1310. Similar modems would be attached at both the networks feed point, such as the power substation, and at low voltage outlets at the users' premises.

Figure 14:
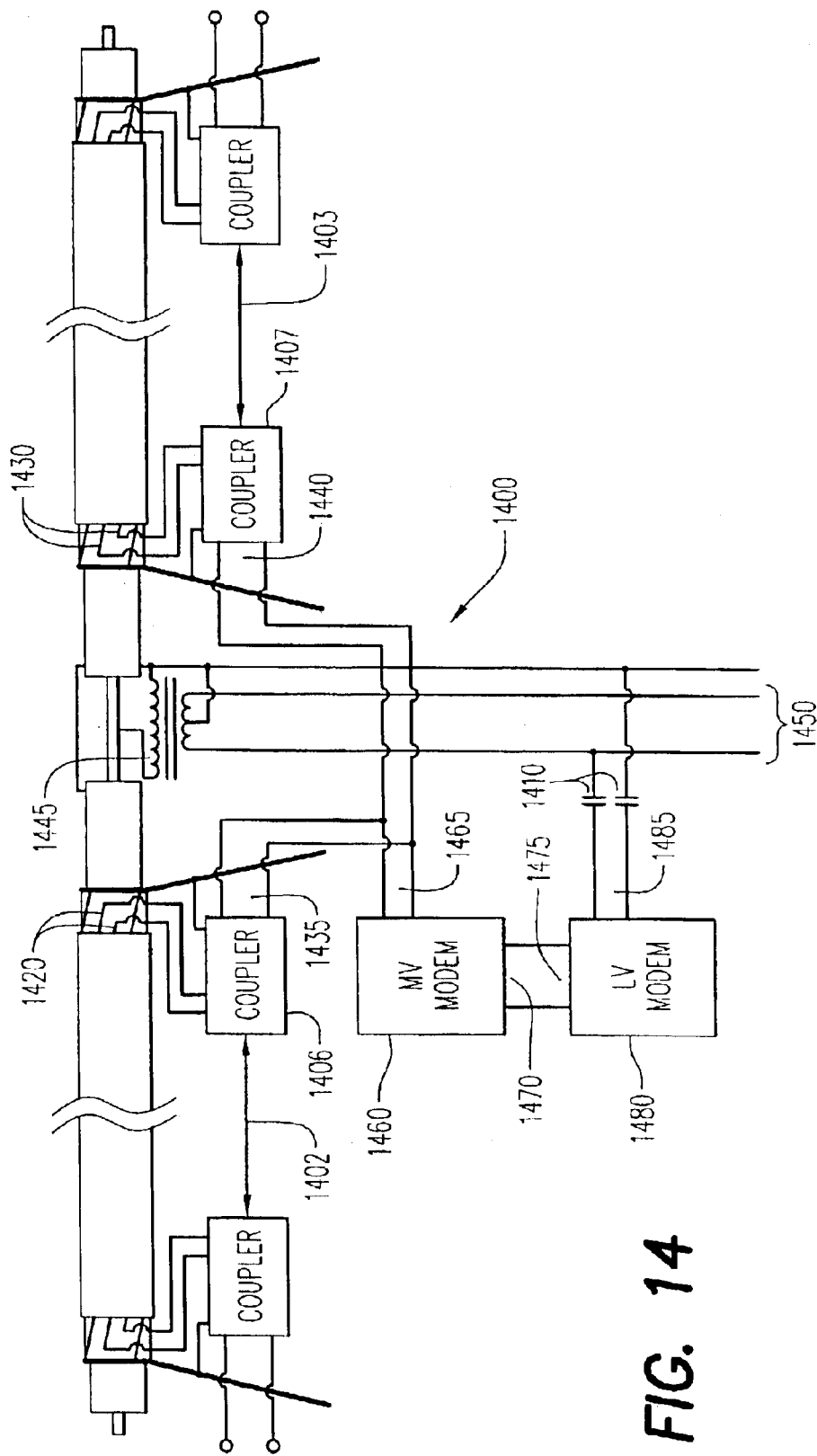
FIG. 14 is a schematic of a technique for coupling modulated data between segments of a power grid using back-to-back modems.

FIG. 14 is a schematic of a technique for coupling modulated data between segments of a power grid using back-to-back modems. FIG. 14 shows a data communication network 1400 implemented over a power distribution system having a first segment 1402 with a first neutral conductor 1420, and a second segment 1403 with a second neutral conductor 1430. Network 1400 includes a first coupler 1406 for inductively coupling a data signal via first neutral conductor 1420, and having a data port 1435 for further coupling of the data signal, and a second coupler 1407 having a data port 1440 coupled to data port 1435 of first inductive coupler 1406, and for inductively coupling the data signal via second neutral conductor 1430.

A first modem 1460 includes a first port for modulated data signals 1465 coupled to data port 1435 of first coupler 1406, and having a second port for digital data 1470 for further coupling of the data signal. A second modem 1480 has a first port for digital data 1475 coupled to second port 1470 of first modem 1460, and a second port 1485 for further coupling of the modulated data signal.

The power distribution system includes a power distribution transformer 1445 having an output power line 1450. Network 1400 further comprises capacitors 1410 between second port 1485 of second modem 1480 and output power line 1450, for coupling the modulated data signal to output power line 1450.

A medium voltage cable may include a long cable segment, such as from a substation to the first distribution transformer in a loop. For ease of installation and service, the long section may be segmented, with access manholes at each node. At these points, the cable segments might be terminated in medium voltage connectors (for center conductor), along with neutral wire collector rings that are grounded. This introduces a discontinuity in the data transmission line, which is carried on one or more neutral wires. To bypass this discontinuity, a pair of couplers can be installed, one on either side of the ground, with their primaries connected to each other, creating a bridging connection.

The present invention also provides for implementing a data communication network using a phase conductor across segments of a power distribution system.

Figure 15:
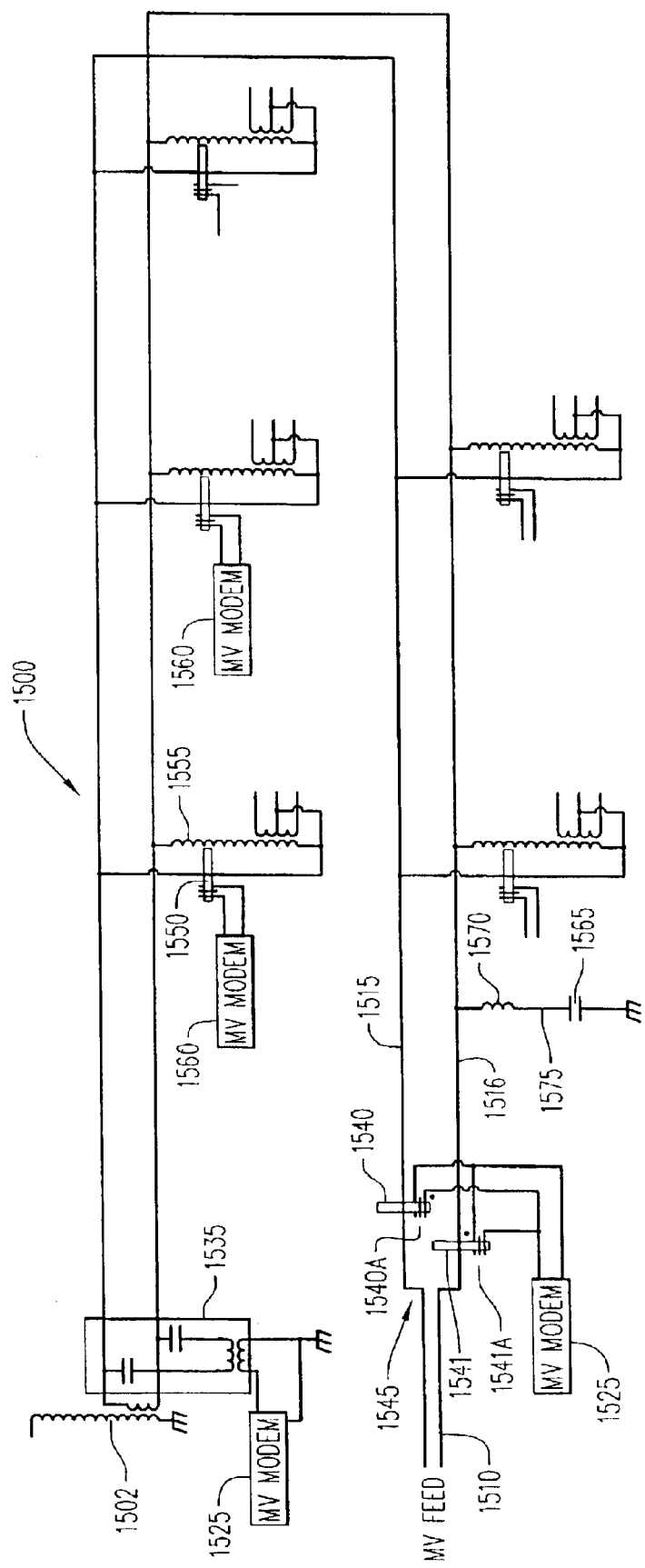
FIG. 15 is a schematic showing several techniques for coupling data to a phase conductor of a power distribution system in an implementation of a data communication network, in accordance with the present invention.

FIG. 15 is a schematic showing several techniques for coupling data to a phase conductor of a power distribution system in an implementation of a data communication network 1500, in accordance with the present invention.

A capacitive coupler is placed on overhead lines fed by an HV-MV step-down transformer. The transformer secondary impedance is of the same order of magnitude as that of overhead lines or larger. A terminator-coupler, e.g., a capacitive coupler with a data port, may be used here that both (a) is used to couple a modem to the line, and (b) terminates the line with a resistance approximately equal to the characteristic impedance of the power transmission cable (as a modem or dummy resistor impedance is reflected through its transformer). Accordingly, FIG. 15 shows that the power distribution system includes a substation HV-MV voltage step-down transformer 1502. A capacitive coupler 1535, i.e., a terminator-coupler, is located proximate to a secondary winding of voltage step-down transformer 1502. A component, such as modem 1525, has an impedance that when reflected through capacitive coupler 1535 is approximately equal to a characteristic impedance of the power transmission cable.

In systems such as in Japan, where the custom is to run a very low impedance coaxial underground cables for lengths up to hundreds of meters to the beginning of an overhead grid, the preferred location for inductive couplers is at the overhead side of the underground-overhead transition point. Here, the low impedance of the underground cable acts like a short circuit at the end of the overhead line, and a closed current loop is formed. Thus, the power distribution system includes a transition 1545 between an overhead cable 1515, 1516 and an underground cable 1510, in which underground cable 1510 has a characteristic impedance that is much lower than that of overhead cable 1515. One or more inductive couplers 1540, 1541 are located on overhead cable 1515, 1516, proximate to transition 1545.

The placement of inductive couplers 1540, 1541 on the three phase overhead cable 1515, 1516 may be done symmetrically with each member of a coupler pair driven with oppositely phased current. Such a drive will substantially cancel the far field electromagnetic radiation, and ease compliance with any regulatory standards. Accordingly, network 1500 may include a pair of inductive couplers 1540, 1541 such that a first inductive coupler, e.g., 1540, of the pair induces a first current in the phase conductor, e.g., 1515, in a first direction, and a second inductive coupler, e.g., 1541, of the pair induces a second current in the second phase conductor, e.g., 1516, in a direction opposite of the first current.

Alternatively, a single phase may be driven, with equal and opposite currents being induced in the other phases, at a distance exceeding one wavelength from an inductive coupler, again canceling much of the far field radiation. For example, one inductive coupler 1540 may be used, and transmission line induction effects may be relied on to balance the currents, after one wavelength down the line.

Inductive couplers may also be placed on the lines feeding a distribution transformer primary, since the transformer primary impedance of some types of distribution transformers may be of the same order of magnitude as that of the overhead lines, and a closed loop is formed. Since this loop carries relatively low power-frequency currents, typically in the 2–8 Ampere range, there is little tendency for core saturation, and coupler cores may be built with little or no air gap. As shown in FIG. 15, an inductive coupler 1550 is located on a line that feeds a primary winding 1555 of a distribution transformer of the power distribution system.

Since the magnitude of the circuit impedance seen by the inductive coupler 1550 may be as high as hundreds of ohms, and modems 1560 along the length of the transmission line attached to inductive coupler 1550 would typically have a 50 ohm impedance, there may be a substantial impedance mismatch.

As shown in FIG. 15, power distribution system 1500 may include a PLC capacitor and/or a power factor correction capacitor, e.g., capacitor 1565, between a phase conductor, e.g., 1516 and ground. Capacitor 1565 may have an impedance lower than that of the power transmission cable 1516. PLC and power factor capacitors may have a high RF impedance, in which case they will not significantly disturb HF signals passing over the power grid. For those devices having an RF impedance whose magnitude is of the same order of magnitude or lower than the characteristic impedance of the power line, such as capacitor 1565, a series choke 1570 may be inserted in series with capacitor 1565. Series choke 1570 may comprise an existing lead wire 1575 to capacitor 1565 by placing one or more snap-on split magnetic cores over lead wire 1575.

The power-frequency current is relatively low, so core saturation will not be a problem. The micro-Henry magnitude of these chokes' inductive impedances will not affect the capacitors' power frequency functioning. Lossy cores may also be used, for they simply increase the high frequency impedance of the choke, and add to the isolation of the capacitor.

The effects of transmission line reflections must be considered as they produce echoes that might introduce errors in the data stream. Spread spectrum modulation is the most likely candidate for such echo-laden transmission, as it is tolerant of narrow band frequency absorption and narrow-band noise, and minimizes emitted electromagnetic radiation due to its low spectral power density. For spread spectrum modems, reflected intra-packet signals that are 6–10 dB or more below the direct signal level will not affect the data reception. Intra-packet reflected signals are defined as reflections that arrive during the direct reception of the original packet.

Impedance disturbances on the power lines may be caused by (a) distribution transformers, with or without the addition of inductive coupler impedance, (b) line terminations, which are typically designed to be fairly well matched to line impedance, (c) T-branches, and (d) PLC or power factor correction capacitors. The reflection coefficient of these impedance discontinuities will generally not exceed 0.5, and the reflected signal is subject to outbound and return loss of the lines themselves, i.e., absorptive loss and radiation loss, so it is expected that the amplitude of reflected signals will be weaker than direct signals by more than 6–10 dB. Thus, the reflected signals that arrive during a data packet will appear as low amplitude noise, and will not prevent the intended data signals from being correctly received.

For couplers placed at low impedance feed points to high impedance lines, such as transition 1545, the loss and reflections due to impedance mismatch are not desirable. Since the very heavy power wires cannot be wound around the coupler core, the secondary can have no more than one turn, and the primary can have no less than one turn. Therefore, the impedance reflected onto the power lines will be equal to the modem impedance, one quarter of that, or less, depending on the turns ratio. For modems with 50-ohm terminal impedance, this reflected impedance is much lower than their characteristic impedance. One solution to improving impedance match is to build modems with an output impedance of a few hundred ohms.

Another solution is to connect a phase-antiphase pair of couplers with their primaries in parallel. The secondaries (MV lines) are necessarily in series. Thus, a 50-ohm modem impedance is transformed into a 100 ohm reflected impedance by the phase-antiphase inductive coupler pair. This principle can be carried further, by using multiple couplers with their primaries paralleled, achieving a series connection of transformer (coupler) windings on the power line side, and a parallel connection on the modem side.

For example, FIG. 15 shows a first inductive coupler 1540 and a second inductive coupler 1541. First inductive coupler 1540 induces a first current in a first direction in phase conductor 1515 via a first winding 1540A, and second inductive coupler 1541 induces a second current in the opposite direction in phase conductor 1516 via a second winding 1541A. First winding 1540A and second winding 1541A are in parallel with one another. In FIG. 15, first winding 1540A and second winding 1541A are marked with dots to show this phase relationship.

The inductive coupler at the overhead feed point must be designed to withstand the effects of the total feed current, which may reach hundreds of Amperes. Since even a one-turn coil carrying such current will saturate the core of currently available magnetic materials appropriate for high frequency operation, this "main line" coupler must generally include an air gap in its magnetic circuit. To achieve sufficient magnetization inductance, such couplers will need a multiplicity of cores forming the equivalent of one core that is very thick in the direction of the power wire.

Figure 16A:
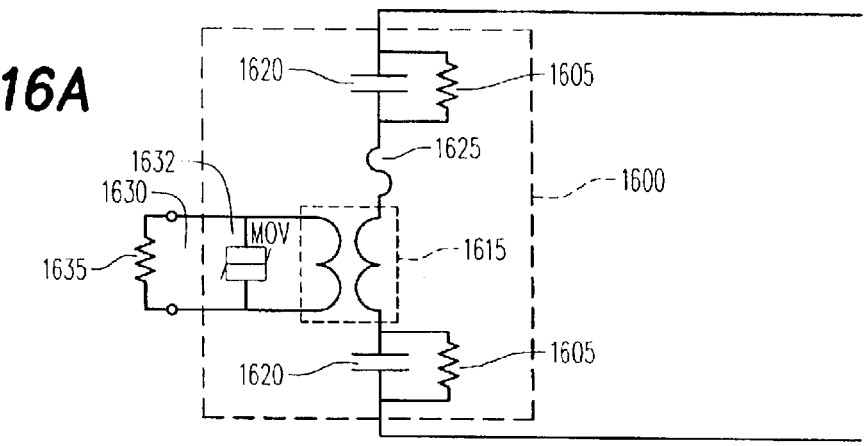
FIG. 16A is a schematic for a capacitive coupler for terminating a transmission line dead end, in accordance with the present invention.
Figure 16B:
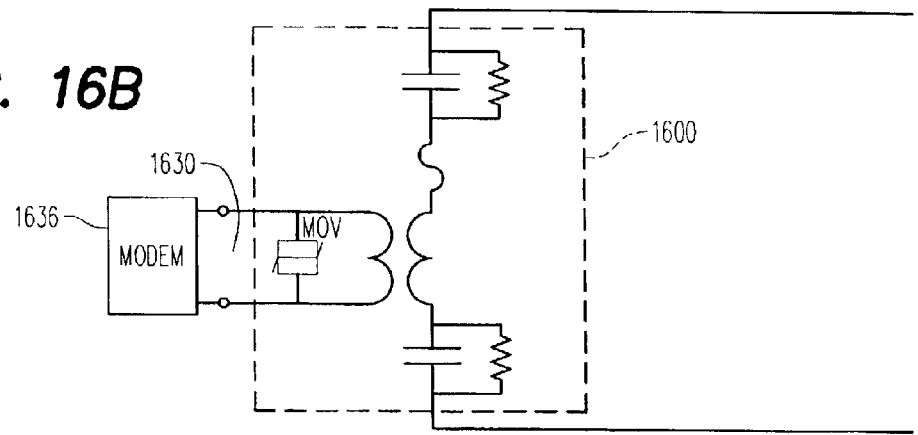
FIG. 16B is a schematic using a capacitive coupler for connecting a modem to a transmission line dead end, in accordance with the present invention.
Figure 16C:
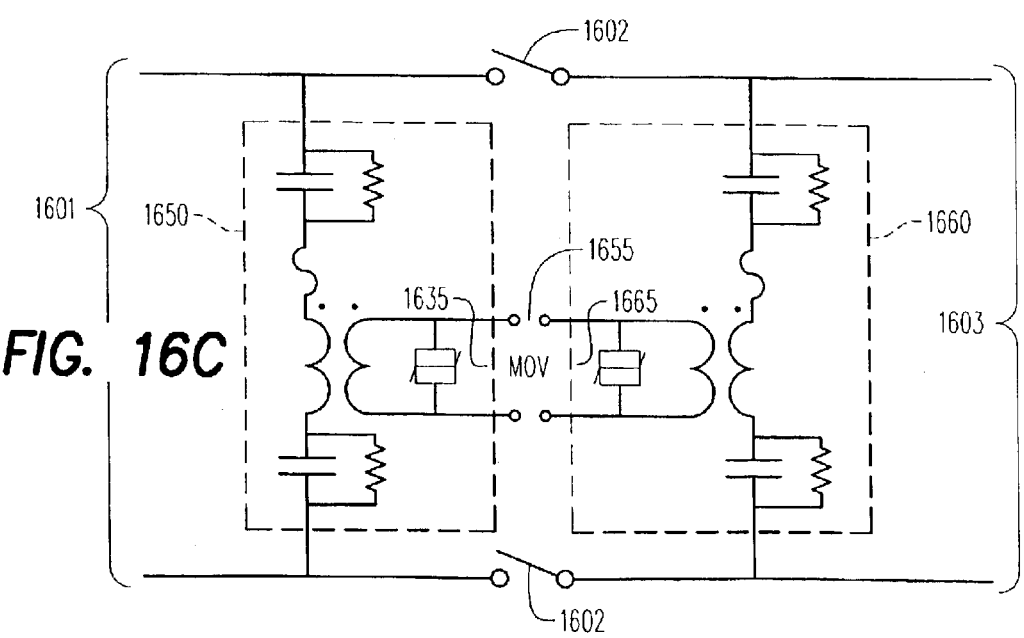
FIG. 16C is a schematic of an arrangement of a capacitive coupler for maintaining continuity of a data signal across a grid disconnect switch, in accordance with the present invention.

FIGS. 16A–16C are schematics representing several uses of capacitive couplers in a communication network implemented over a power distribution system. These capacitive couplers are used at nodes in the network where inductive couplers might not be effective, e.g., at points where there is an effective open circuit to RF current.

A capacitive coupler 1020, such as used in FIGS. 10A and 10B, is shown in FIG. 16A, marked there as capacitive coupler 1600. Capacitive coupler 1600 should be capable of continuously withstanding the working voltage supplied by the phase conductor and a series of BIL pulses, e.g., 125 kV for a 15 kV working voltage, as per IEEE Specification 386. Capacitive coupler 1600 should also be constructed so as to eliminate corona breakdown as per the above specification.

Capacitive coupler 1600 connects to the MV lines via high voltage capacitors 1620, e.g., 10 nF, whose impedance at the lowest relevant frequency is a fraction of the characteristic impedance of the power transmission cable. Optionally, capacitive coupler 1600 may include a safety fuse 1625 in series with capacitor 1620, to avoid faulting the medium voltage line should in case of a short-circuit.

High resistance bleeder resistors 1605 are connected in parallel with each capacitor 1620 to discharge them when they are not connected to energized circuits. Charged capacitors would be a hazard to personnel. To further isolate the data port 1630 from the MV lines, a high frequency isolation transformer 1615 is used, with an optional non-unity turns ratio, if needed, for impedance transformation.

To protect devices that are connected to data port 1630, a surge protector 1632, such as an metal oxide varistor (MOV) may be connected across the terminals of data port 1630 to limit the amplitude of pulses that might otherwise be coupled from the MV lines to the devices.

Preferably, in the network in which the capacitor is installed, one terminal of capacitive coupler 1600 is connected to a medium voltage phase line, and the other terminal connected to neutral (for single phase lines) or to a second phase line (for multiphase lines).

When used to terminate a dead end of a transmission line, capacitive coupler 1600 may be used, together with a termination resistor 1635, connected to data port 1630, to match the power transmission cable's characteristic impedance.

FIG. 16B illustrates the use of capacitive coupler 1600 for coupling a modem 1636 onto a dead end of a power transmission cable. Modem 1636 is connected to data port 1630.

FIG. 16C is a schematic of an arrangement of capacitive couplers for maintaining continuity of a data signal across a grid segmentation switch. FIG. 16C shows a power distribution system having a phase conductor with a first segment 1601 on a first side of a switch 1602 and a second segment 1603 on a second side of switch 1602. A first capacitive coupler 1650 couples a data signal via first segment 1601, and has a data port 1635 for further coupling of the data signal. A second capacitive coupler 1660 has a data port 1665 coupled to data port 1635 of first capacitive coupler 1650, and couples the data signal via second segment 1603. Thus, a transmission of the data signal between first segment 1601 and second segment 1603 is maintained when switch 1602 is opened.

The present invention employs a variety of network protocols to extend physical range and improve reliability. After passing through inductive couplers and encountering impedance mismatches, tee junctions, and radiation loss, the amplitude of the signal available to the modem's receiver may become very weak. Whether this weakness is relative to a modem's internal noise or to ambient electrical noise on the medium voltage lines, there will be a physical point beyond which the signal cannot be detected and demodulated into data with an acceptably low error rate.

Bi-directional modems may be added to regenerate and strengthen the signal if high impedance chokes are also used to isolate the medium voltage grid into independent segments.

The data communication network can employ communication protocols that include the passing of data tokens from node to node. At each node, the token, which provides signaling or control, or includes a data packet as payload, is stored, interpreted, and routed to either the modem's local data user or else to the next node on the network. The time required to store, interpret and retransmit a token will reduce considerably the effective net data rate of such a network, if each node is always on-line.

In accordance with the present invention, only certain nodes are programmed to be active at any given moment, namely the node to which the token is addressed and a minimum fixed subset of nodes distributed along the network that are required to maintain a minimum signal amplitude for all points on the network. When this subset of nodes is active, there will be an advantageous tradeoff of time delay and reduced net data rate in return for increased physical range and improved error rate.

The determination of identity of the permanently active node members can be achieved by manual measurements of the attenuation between all nodes of the medium voltage network. Preferably, the modems are equipped with circuits that measure the voltage amplitude and/or signal to noise ratio, and are interrogated by a network media access control layer. The nodes should also be programmed to accept a command that keeps them in a permanently active relaying mode, even for tokens or packets that are not addressed to them.

An algorithm can then be implemented that determines which nodes should be set permanently active, and issues a stream of commands to all nodes to set the appropriate nodes permanently active. The algorithm is run each time the configuration of the medium voltage grid is changed, but this is a relatively rare event.

Closely spaced nodes will enjoy a data rate equal to the maximum network rate while more distant nodes will still be serviced by reliable, low error rate service, albeit at a lower data rate. In principle, it is claimed that the described arrangement removes all distance limits from medium voltage communications.

The transmission line formed by the selected conductor and its neighbors is inherently a wide bandwidth, low loss, and low dispersion medium. For overhead lines, the losses would be due to skin effect and radiation, the latter being relatively ineffective since the lines are not resonant at most frequencies. For underground lines, the losses would be due to skin effect and the insulation's lossiness, e.g., outer layer of plastic and inner layer of semiconducting material.

The present invention produces a low electromagnetic emission and has a low susceptibility to external noise, especially when used with spread spectrum techniques. Power levels may also be kept low, because of low cable-to-coupler loss. Susceptibility to external noise sources would be proportional to radiation, with the modes having the lowest electromagnetic interference (EMI) also being those most resistant to external noise reception, based on the reciprocity principle.

For single-ended mode (see FIG. 2A), the two neighbors of the selected conductor act in anti-phase to the central conductor for both electrical and magnetic radiation modes. An observer at distance would see substantial cancellation of fields.

For balanced modes, there would be both far-field cancellation and a shielding affect of the grounded neighbors. For transformer termination (See FIG. 2B), the coupling loss would be lowest, and drive power levels could be kept relatively low, giving the lowest EMI levels. For choke termination, drive power levels would be slightly higher.

If the modems act as repeaters, then drive power levels can be held to the minimum required for a single segment, further reducing radiation.

A data communication network in accordance with the present invention offers a capacity for very high data rates, e.g., exceeding 10 Mbps. The couplers are all magnetic and electrostatic devices with bandwidths that can reach at least tens of megahertz if high frequency magnetic and dielectric materials are used. Transmission lines that are not too lossy and that have minimal dispersion could conduct frequencies exceeding 20 MHz. Such frequencies could be used for modems using various modulation schemes, and even at one bit per Hertz, would yield high data rates.

Baseband signaling can also be employed if the data coding eliminates long strings of all-1's and all-0's. With inter-segment connections that include regeneration (repeaters), the bandwidth would be much larger than obtainable with passive linking of segments.

The couplers of the present invention can be installed with little or no interruption of power service to customers. Installation can also be accomplished without exposure to high voltages. Employing gloved linemen, the authorities may allow placing an inductive coupler around a cable, while the cable is in service. Even if the authorities insist that workmen not work on energized cables, the loop architecture of neighborhood medium voltage grids allows disconnecting a single cable segment, without interrupting service to customers. For the relatively few capacitive couplers, a single short power outage might be needed.

The present invention permits continued operation of a data communication network even during power outage. Operation continues even during interruptions in medium voltage power.

The present invention poses little or no impact on reliability of electrical grid. Inductive couplers have no fault modes that would affect power flow. The few capacitive couplers, with their fuses, would also not cause a line fault.

For the embodiments of FIGS. 2A and 2B, winding the coupler with a thicker wire would preclude its failure due to over-current, and using industry-standard connections between the selected neutral and the coupler should minimize connection failure. Were an open circuit to occur, it leaves (N−1)/N of the current-carrying capacity intact, or 87.5% in the case discussed. Since the cable usually runs at much below its 200 A capacity, such a failure should have no effect.

Short circuit of the coupler would impact data communications, but such would merely restore the neutral conductor to its original state. Accordingly, the power grid would not be adversely impacted.

Short circuit of the neutral or any other part of the coupler to ground would have not effect on the MV line, as its neutral is proximately connected to the ground rod. Failure of the magnetic circuit, open, short or saturation, would have no effect on the supply of electric power or the safety of system.

The couplers use only passive components, implying a virtually unlimited life of service. The inductive coupler can be any suitable transformer or inductor.

In the passive implementation, the inductive couplers use only passive components, e.g. wires wound around magnetic cores, and these have no wear mechanisms. The capacitive couplers also have no wear mechanisms.

The passive construction, and ease of installation of the inductive couplers provide a low cost solution to the problem of coupling to medium voltage power distribution lines and utilizing them a backhaul data channels. Installation time should be less than 15 minutes for the predominant inductive, and installation costs minimal.

There is a clear advantage of the embodiments that use neutral lines, as compared to capacitive bypass couplers that employ the medium voltage conductors to carry data. The latter make contact with the medium voltage line at least once each transformer, and must withstand full fault voltages. For example, a Coupler for a 15 kV rms phase-to-ground cable must be tested for 125 kV BIL. This makes the capacitive coupler very bulky and expensive, and adds many more potential points of failure to the system.

It should be understood that various alternatives and modifications could be devised by those skilled in the art. The present invention is intended to embrace all such alternatives, modifications and variances that fall within the scope of the appended claims.

What is claimed is:

1. A coupler for a data signal, comprising:
   a core through which a phase conductor of a power distribution system can be routed to serve as a first winding; and
   a second winding wound around a portion of said core,
   wherein said first winding has an impedance that is negligible at a power distribution frequency of said power distribution system, and
   wherein said data signal is inductively coupled between said phase conductor and said second winding via said core.

2. The coupler of claim 1, wherein said core has an air gap.

3. The coupler of claim 1, further comprising a capacitor in series with said second winding.

4. The coupler of claim 1, further comprising a surge protector connected in parallel with said second winding.

5. The coupler of claim 1, wherein said coupler comprises a radio frequency (RF) transformer.

6. The coupler of claim 1, wherein said data signal is bi-directionally coupled between said phase conductor and said second winding via said core.

7. The coupler of claim 1, wherein said data signal is carried by a carrier frequency in a range of about 1 MHz to about 50 MHz.

8. The coupler of claim 1, wherein said data signal is carried by a carrier frequency greater than or equal to about 10 MHz.

9. The coupler of claim 1, wherein said phase conductor carries a power signal having a voltage in a range of about 4 kV to about 66 kV.

10. The coupler of claim 1, wherein said data signal is carried by a spread spectrum modulated carrier.

11. The coupler of claim 1,
wherein said coupler presents a reflected impedance at a frequency of a carrier of said data signal,
wherein said phase conductor presents a characteristic impedance at said frequency of said carrier, and
wherein said reflected impedance is less than said characteristic impedance.

12. The coupler of claim 1,
wherein said coupler has a leakage inductance with an impedance at a frequency of a carrier of said data signal,
wherein said phase conductor presents a characteristic impedance at said frequency of said carrier, and
wherein said impedance of said leakage inductance is less than said characteristic impedance.

13. The coupler of claim 1, wherein said phase conductor passing through said core has an inductance sufficient to present appreciable high frequency impedance to a modem transmitter at a frequency of a carrier of said data signal.

14. A data communication network implemented over a power distribution system having a power transmission cable with a phase conductor, said data communication network comprising:
a first coupler having a core through which said phase conductor can be routed to serve as a first winding, and a second winding wound around a portion of said core, wherein said first winding has an impedance that is negligible at a power distribution frequency of said power distribution system, and wherein said data signal is inductively coupled between said phase conductor and said second winding via said core; and
a second coupler for coupling said data signal via said phase conductor,
wherein said data signal is communicated between said first coupler and said second coupler via said phase conductor.

15. The data communication network of claim 14, wherein said phase conductor is part of a medium voltage grid of said power distribution system.

16. The data communication network of claim 14, further comprising:

a first modem having a first port for coupling said data signal via said first coupler, and having a second port for further coupling of said data signal;
a router having a first port for coupling said data signal via said second port of said first modem and having a second port for further coupling of said data signal; and
a second modem having a first port coupled to said second port of said router, and having a second port for coupling said data signal via said second coupler.

17. The data communications network of claim 14, wherein said data signal is bi-directionally coupled between said phase conductor and said second winding via said core.

18. The data communications network of claim 14, wherein said data signal is carried by a carrier frequency in a range of about 1 MHz to about 50 MHz.

19. The data communications network of claim 14, wherein said data signal is carried by a carrier frequency greater than or equal to about 10 MHz.

20. The data communications network of claim 14, wherein said phase conductor carries a power signal having a voltage in a range of about 4 kV to about 66 kV.

21. The data communications network of claim 14, wherein said data signal is carried by a spread spectrum modulated carrier.

22. A coupler for a data signal, comprising:
a core through which a phase conductor of a power distribution system can be routed to serve as a first winding, wherein said phase conductor carries a power signal having a voltage in a range of about 4 kV to about 66 kV; and
a second winding wound around a portion of said core,
wherein said first winding has an impedance that is negligible at a power distribution frequency of said power distribution system, and
wherein said data signal is carried by a spread spectrum modulated carrier and inductively coupled between said phase conductor and said second winding via said core.

23. A method, comprising:
routing a phase conductor of a power distribution system through a core of a coupler to serve as a first winding, wherein said first winding has an impedance that is negligible at a power distribution frequency of said power distribution system; and
inductively coupling a data signal carried by a spread spectrum modulated carrier, via said core, between said phase conductor and a second winding wound around a portion of said core.

24. The method of claim 23, wherein said data signal is bi-directionally coupled between said phase conductor and said second winding via said core.

25. The method of claim 23, wherein said carrier is in a frequency range of about 1 MHz to about 50 MHz.

26. The method of claim 23, wherein said carrier is at a frequency greater than or equal to about 10 MHz.

27. The method of claim 23, wherein said phase conductor carries a power signal having a voltage in a range of about 4 kV to about 66 kV.

* * * * *